United States Patent
Saito

(10) Patent No.: US 10,817,229 B2
(45) Date of Patent: Oct. 27, 2020

(54) FEEDING INSTRUCTION APPARATUS, METHOD OF CONTROLLING FEEDING INSTRUCTION APPARATUS, AND STORAGE MEDIUM

(71) Applicant: CANON KABUSHIKI KAISHA, Tokyo (JP)

(72) Inventor: Koji Saito, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/529,883

(22) Filed: Aug. 2, 2019

(65) Prior Publication Data

US 2020/0050409 A1    Feb. 13, 2020

(30) Foreign Application Priority Data

Aug. 7, 2018  (JP) .................................. 2018-148878

(51) Int. Cl.
G06F 3/12    (2006.01)

(52) U.S. Cl.
CPC .......... *G06F 3/1219* (2013.01); *G06F 3/1229* (2013.01); *G06F 3/1296* (2013.01)

(58) Field of Classification Search
CPC ............................ G06F 3/1219; G06F 3/1229
See application file for complete search history.

(56) References Cited

U.S. PATENT DOCUMENTS

| 7,471,401 | B2 | 12/2008 | Saito |
| 8,547,561 | B2 | 10/2013 | Saito |
| 10,118,420 | B2 * | 11/2018 | Arisawa ............... B41J 13/0018 |

FOREIGN PATENT DOCUMENTS

JP    2018-024517 A    2/2018

* cited by examiner

*Primary Examiner* — Ibrahim Siddo
(74) *Attorney, Agent, or Firm* — Venable LLP

(57) ABSTRACT

A feeding instruction apparatus includes a transmission unit configured to transmit multiple feeding instructions in a case where a print job is received, with the feeding instructions each being an instruction to feed a certain number of print media, the certain number being two or more but less than the total number of print media to be used for printing based on the one received print job. A timing when a predetermined feeding instruction included in the multiple feeding instructions is transmitted is controlled based on a time period required for the predetermined image processing to be performed on the image data corresponding to images to be printed on print media to be fed based on the predetermined feeding instruction.

15 Claims, 22 Drawing Sheets

| PAPER-FEEDING NUMBER 801 | PAPER-FEEDING TIMING W (NUMBER OF SHEETS) 802 | NUMBER OF SHEETS TO BE ADDITIONALLY FED A (NUMBER OF SHEETS) 803 | PAPER-FEEDING COMPLETION FLAG F 804 |
|---|---|---|---|
| 1 | 5 | 5 | TRUE |
| ... | ... | ... | ... |

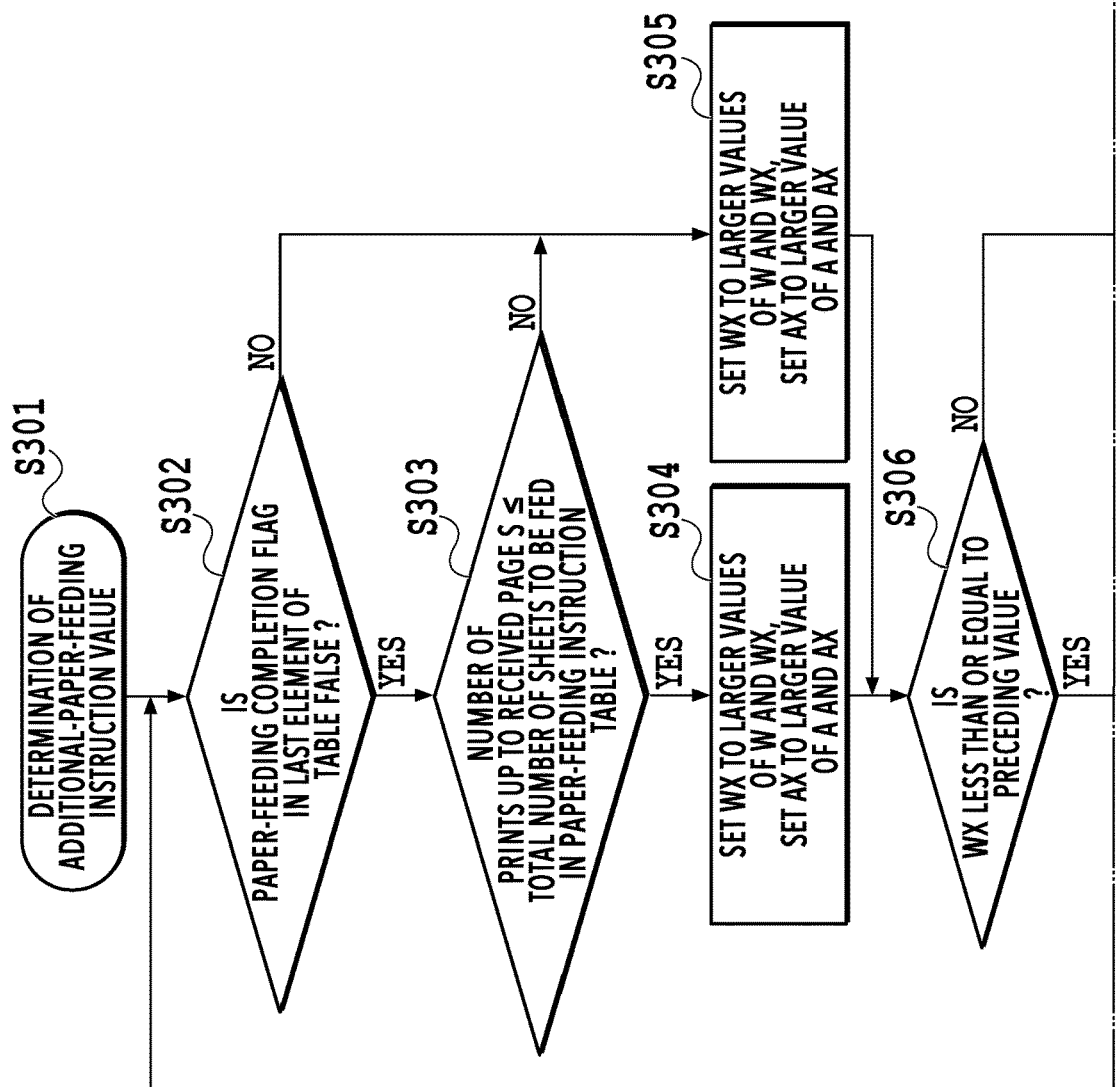

| PAPER-FEEDING NUMBER | PAPER-FEEDING TIMING W | NUMBER OF SHEETS TO BE ADDITIONALLY FED A | PAPER-FEEDING COMPLETION FLAG F |
|---|---|---|---|
| [1] | 5 (W1) | 3 (A1) | TRUE |
| [2] | 5 (W2) | 3 (A2) | FALSE |
| [3] | 5 (W3) | 3 (A3) | FALSE |
| [4] | 3 (W4) | 3 (A4) | FALSE |
| [5] | 3 (W5) | 3 (A5) | FALSE |
| [6] | 3 (W6) | 6 (A6) | FALSE |
| [7] | 5 (W7) | 3 (A7) | FALSE |
| [8] | 5 (W8) | 3 (A8) | FALSE |
| [9] | 5 (W9) | 3 (A9) | FALSE |
| [10] | 5 (W10) | 1 (A10) | FALSE |

AT RECEPTION OF PAGE 9

JOB FOR 9 PAGES, 4 COPIES
1-3 PAGE : W=5
4-6 PAGE : W=3
7-9 PAGE : W=5

FIG.16

INITIAL TABLE

JOB FOR 9 PAGES,
4 COPIES
1-3PAGE : W=5
4-6PAGE : W=3
7-9PAGE : W=5

| PAPER-FEEDING NUMBER 801 | PAPER-FEEDING TIMING W 802 | NUMBER OF SHEETS TO BE ADDITIONALLY FED A 803 | PAPER-FEEDING NUMBER F 804 |
|---|---|---|---|
| [1] | 3 (W1) | 3 (A1) | FALSE |

FIG.17A

AT RECEPTION OF PAGE 1

JOB FOR 9 PAGES,
4 COPIES
1-3PAGE : W=5
4-6PAGE : W=3
7-9PAGE : W=5

| PAPER-FEEDING NUMBER 801 | PAPER-FEEDING TIMING W 802 | NUMBER OF SHEETS TO BE ADDITIONALLY FED A 803 | PAPER-FEEDING NUMBER F 804 |
|---|---|---|---|
| [1] | 5 (W1) | 3 (A1) | FALSE |

FIG.17B

AT RECEPTION OF PAGE 2

JOB FOR 9 PAGES,
4 COPIES
1-3PAGE : W=5
4-6PAGE : W=3
7-9PAGE : W=5

| PAPER-FEEDING NUMBER 801 | PAPER-FEEDING TIMING W 802 | NUMBER OF SHEETS TO BE ADDITIONALLY FED A 803 | PAPER-FEEDING NUMBER F 804 |
|---|---|---|---|
| [1] | 5 (W1) | 3 (A1) | TRUE |

FIG.17C

AT RECEPTION OF PAGE 3

JOB FOR 9 PAGES, 4 COPIES
1-3PAGE : W=5
4-6PAGE : W=3
7-9PAGE : W=5

| PAPER-FEEDING NUMBER | PAPER-FEEDING TIMING W | NUMBER OF SHEETS TO BE ADDITIONALLY FED A | PAPER-FEEDING NUMBER F |
|---|---|---|---|
| [1] | 5 (W1) | 3 (A1) | TRUE |
| [2] | 5 (W2) | 3 (A2) | FALSE |
| [3] | 5 (W3) | 3 (A3) | FALSE |

FIG.17D

AT RECEPTION OF PAGE 6

JOB FOR 9 PAGES, 4 COPIES
1-3PAGE : W=5
4-6PAGE : W=3
7-9PAGE : W=5

| PAPER-FEEDING NUMBER | PAPER-FEEDING TIMING W | NUMBER OF SHEETS TO BE ADDITIONALLY FED A | PAPER-FEEDING NUMBER F |
|---|---|---|---|
| [1] | 5 (W1) | 3 (A1) | TRUE |
| [2] | 5 (W2) | 3 (A2) | FALSE |
| [3] | 5 (W3) | 3 (A3) | FALSE |
| [4] | 5 (W4) | 3 (A4) | FALSE |
| [5] | 5 (W5) | 3 (A5) | FALSE |
| [6] | 5 (W6) | 3 (A6) | FALSE |
| [7] | 5 (W7) | 3 (A7) | FALSE |

FIG.17E

JOB FOR 9 PAGES,
4 COPIES
1-3PAGE : W=5
4-6PAGE : W=3
7-9PAGE : W=5

AT RECEPTION OF PAGE 7 (BEFORE UPDATE)

| PAPER-FEEDING NUMBER | PAPER-FEEDING TIMING W | NUMBER OF SHEETS TO BE ADDITIONALLY FED A | PAPER-FEEDING NUMBER F |
|---|---|---|---|
| [1] | 5 (W1) | 3 (A1) | TRUE |
| [2] | 5 (W2) | 3 (A2) | FALSE |
| [3] | 5 (W3) | 3 (A3) | FALSE |
| [4] | 5 (W4) | 3 (A4) | FALSE |
| [5] | 5 (W5) | 3 (A5) | FALSE |
| [6] | 5 (W6) | 3 (A6) | FALSE |
| [7] | 5 (W7) | 3 (A7) | FALSE |
| [8] | 5 (W8) | 3 (A8) | FALSE |

FIG.17F

JOB FOR 9 PAGES,
4 COPIES
1-3PAGE : W=5
4-6PAGE : W=3
7-9PAGE : W=5

AT RECEPTION OF PAGE 7 (AFTER UPDATE)

| PAPER-FEEDING NUMBER | PAPER-FEEDING TIMING W | NUMBER OF SHEETS TO BE ADDITIONALLY FED A | PAPER-FEEDING NUMBER F |
|---|---|---|---|
| [1] | 5 (W1) | 3 (A1) | TRUE |
| [2] | 5 (W2) | 3 (A2) | FALSE |
| [3] | 5 (W3) | 3 (A3) | FALSE |
| [4] | 3 (W4) | 3 (A4) | FALSE |
| [5] | 3 (W5) | 3 (A5) | FALSE |
| ~~[6]~~ | ~~3 (W6)~~ | ~~3 (A6)~~ | ~~FALSE~~ |
| ~~[7]~~ | ~~3 (W7)~~ | ~~3 (A7)~~ | ~~FALSE~~ |
| [6] | 3 (W6) | 6 (A6) | FALSE |
| [7] | 5 (W7) | 3 (A7) | FALSE |

FIG.17G

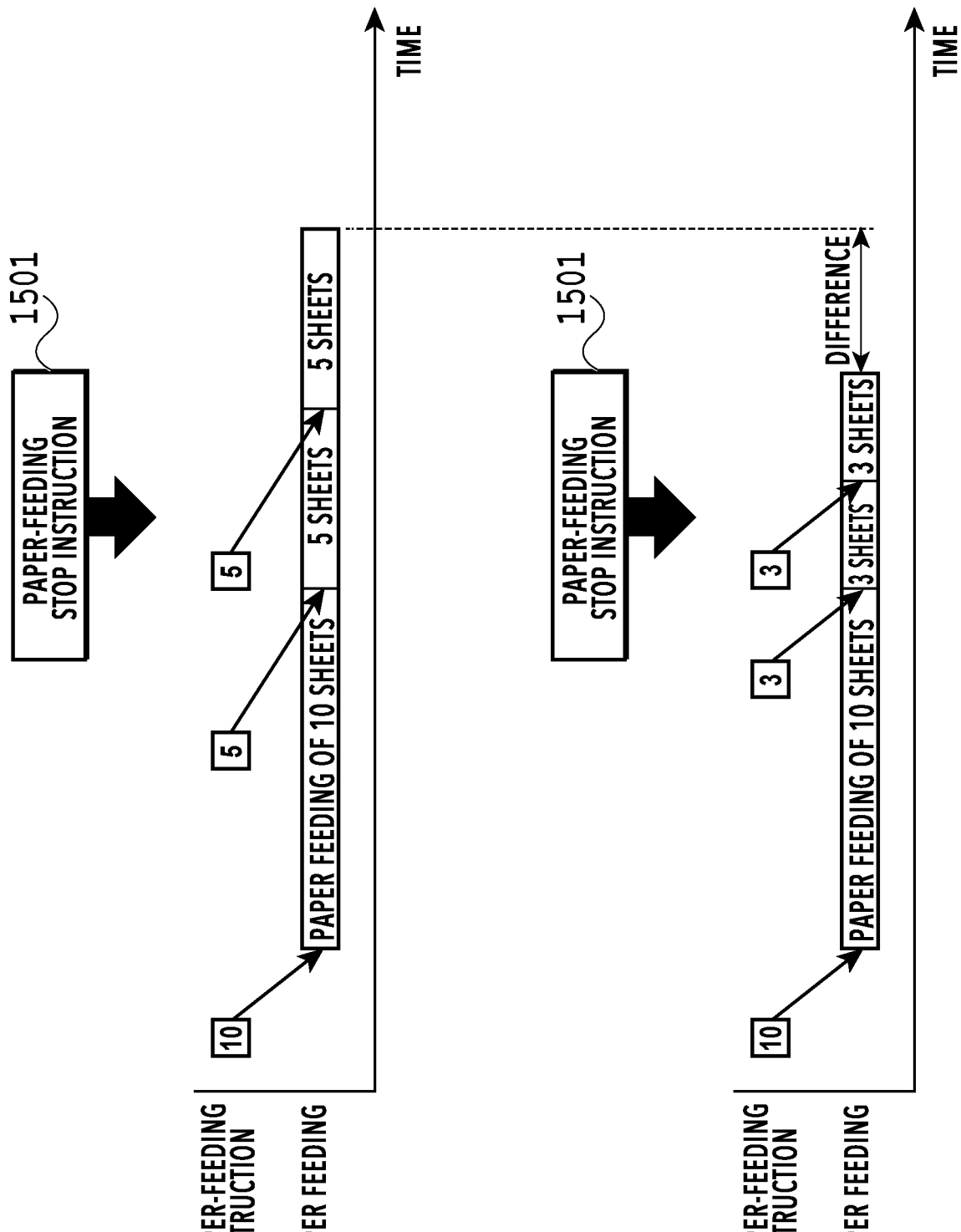

FEEDING INSTRUCTION APPARATUS, METHOD OF CONTROLLING FEEDING INSTRUCTION APPARATUS, AND STORAGE MEDIUM

BACKGROUND OF THE INVENTION

Field of the Invention

The present invention relates to feeding instruction apparatuses that continuously feed print media, methods of controlling the same, and storage media.

Description of the Related Art

There are known feeding apparatuses that continuously feed print media to the conveyance section that conveys the print media to the printing section. The feeding apparatuses achieve high-speed printing by feeding print media to the conveyance section continuously without waiting for the completion of printing on each print medium.

Japanese Patent Laid-Open No. 2018-024517 describes an apparatus that feeds print media continuously to the conveying path to execute printing.

Meanwhile, a feeding apparatus feeds print media to the conveyance section in response to the reception of a feeding instruction to feed print media, transmitted from a feeding instruction apparatus. As feeding apparatuses that feed print media continuously to the conveyance section is getting popular, it is desired to achieve proper feeding of print media by a feeding instruction apparatus properly transmitting feeding instructions to the feeding apparatus.

SUMMARY OF THE INVENTION

An object of the present invention is to properly transmit feeding instructions to a feeding apparatus. An aspect of the present invention is a feeding instruction apparatus including: a job reception unit configured to receive a print job for printing images on multiple print media; a data reception unit configured to receive image data corresponding to the received print job; an image processing unit configured to perform predetermined image processing on the received image data; and a transmission unit configured to transmit multiple feeding instructions in a case where the print job is received, the feeding instructions each being an instruction to feed a certain number of print media, the certain number being two or more but less than the total number of print media to be used for printing based on the one received print job, in which a timing when a predetermined feeding instruction included in the multiple feeding instructions is transmitted is controlled based on a time period required for the predetermined image processing to be performed on the image data corresponding to images to be printed on print media to be fed based on the predetermined feeding instruction, every time a feeding unit receives the feeding instruction, the feeding unit feeds print media, the number of which is based on the received feeding instruction, one by one to a conveyance section, and a printing section prints images based on the one print job onto multiple print media conveyed via the conveyance section based on the multiple feeding instructions.

Further features of the present invention will become apparent from the following description of exemplary embodiments with reference to the attached drawings.

BRIEF DESCRIPTION OF THE DRAWINGS

FIG. 8 is a diagram illustrating an element of a table for performing a paper-feeding instruction;

FIG. 13 is a diagram illustrating a relationship between FIG. 13A and FIG. 13B;

FIGS. 13A and 13B are flowcharts illustrating a process for an additional-paper-feeding instruction;

FIG. 16 is a diagram illustrating a specific example of a paper-feeding instruction table used for the operation in FIG. 15;

FIGS. 17A to 17G are diagrams illustrating a process of creating the paper-feeding instruction table illustrated in FIG. 16; and FIGS. 18A and 18B are diagrams illustrating examples of the number of sheets discharged after a paper-feeding stop instruction is issued.

DESCRIPTION OF THE EMBODIMENTS

Embodiments of the present invention will be described with reference to the drawings.

[Image Forming Apparatus]

Figure 1:
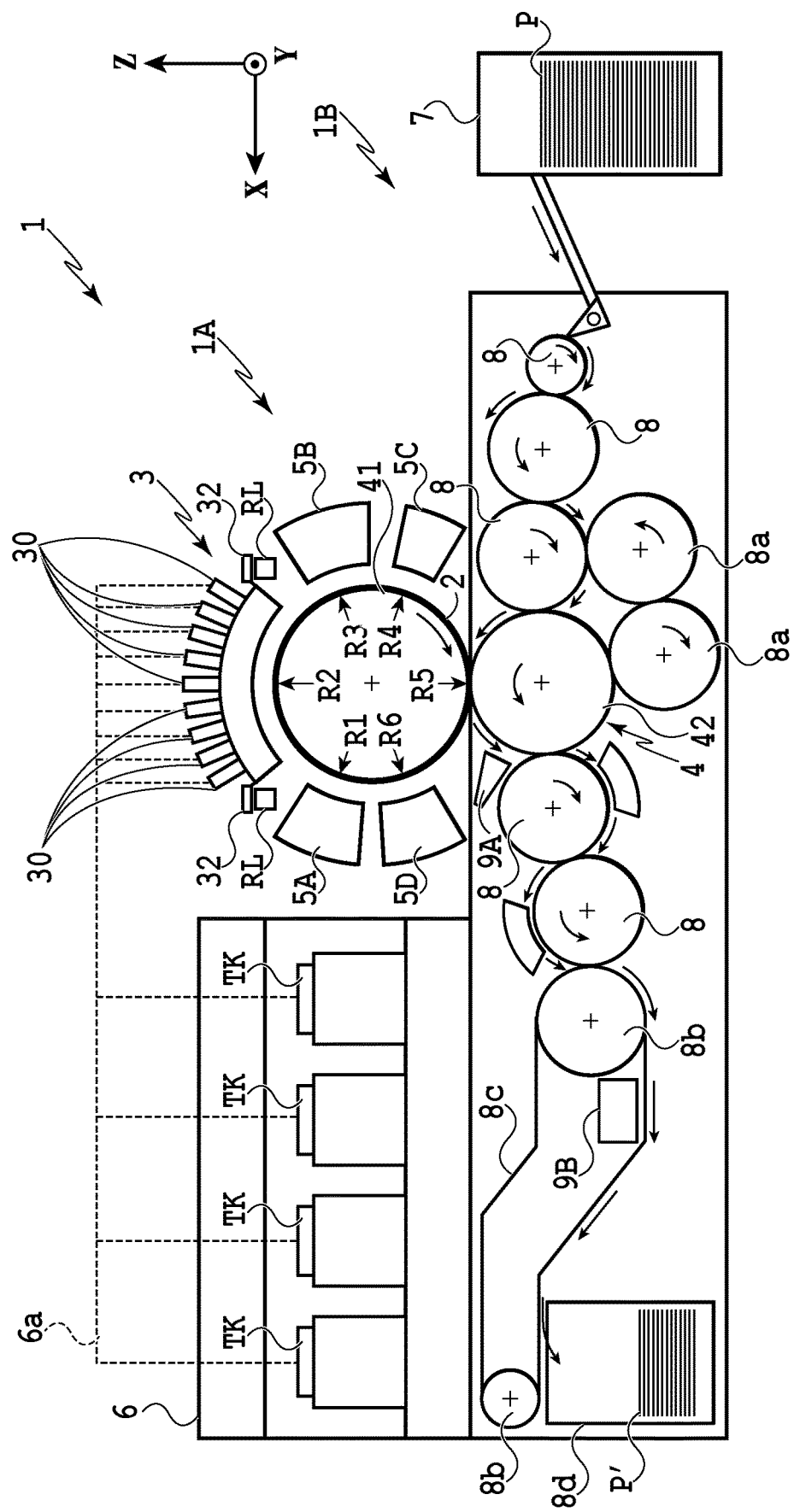
FIG. 1 is a schematic diagram of an image forming apparatus.

FIG. 1 is a schematic front view of an image forming apparatus 1 according to an embodiment of the present invention. The image forming apparatus 1 in the present embodiment is a sheet-fed inkjet printer that produces printed products P' by transferring ink images onto print media P via a transfer body 2. The image forming apparatus 1 includes an image forming unit 1A and a conveyance section 1B. In the present embodiment, the X, Y, and Z directions indicate the width direction (longitudinal direction), depth direction, and height direction, respectively, of the image forming apparatus 1. The print medium P is conveyed in the X direction.

Note that in this specification, [printing] not only means forming information with meaning, such as characters and figures, but also widely means forming images, designs, patterns, or the like, whether they have meaning or not, onto print media, and it also includes processing media. Thus, the results of [printing] are not limited to what is made apparent so that humans can perceive it visually. In the present embodiment, it is assumed that [print media] are sheets of paper. Thus, in the following description, feeding of print media are also referred to as [paper feeding]. Print media may be cloth, plastic films, and the like in addition to paper.

Although the component of ink is not limited to any specific ones, it is assumed in the present embodiment that aqueous pigment ink containing pigments which are coloring materials, water, and resins is used.

Note that the feature of the present embodiment lies in paper-feeding instructions that are transmitted to a paper-feeding unit (paper-feeding apparatus) that executes paper feeding. Thus, the present embodiment is applied to at least an apparatus (feeding instruction apparatus) in the image forming apparatus 1, configured to transmit paper-feeding instructions (feeding instructions). Although, it is assumed in the present embodiment that the paper-feeding instruction apparatus, image forming apparatus, and paper-feeding apparatus are included in one casing, the paper-feeding instruction apparatus and the image forming apparatus, for example, may be separate, or the paper-feeding instruction apparatus and the paper-feeding apparatus may be separate.

(Image Forming Unit)

An image forming unit 1A includes a printing section 3, a transfer unit 4, peripheral units 5A to 5D, and a supply unit 6.

<Printing Section>

Figure 2:
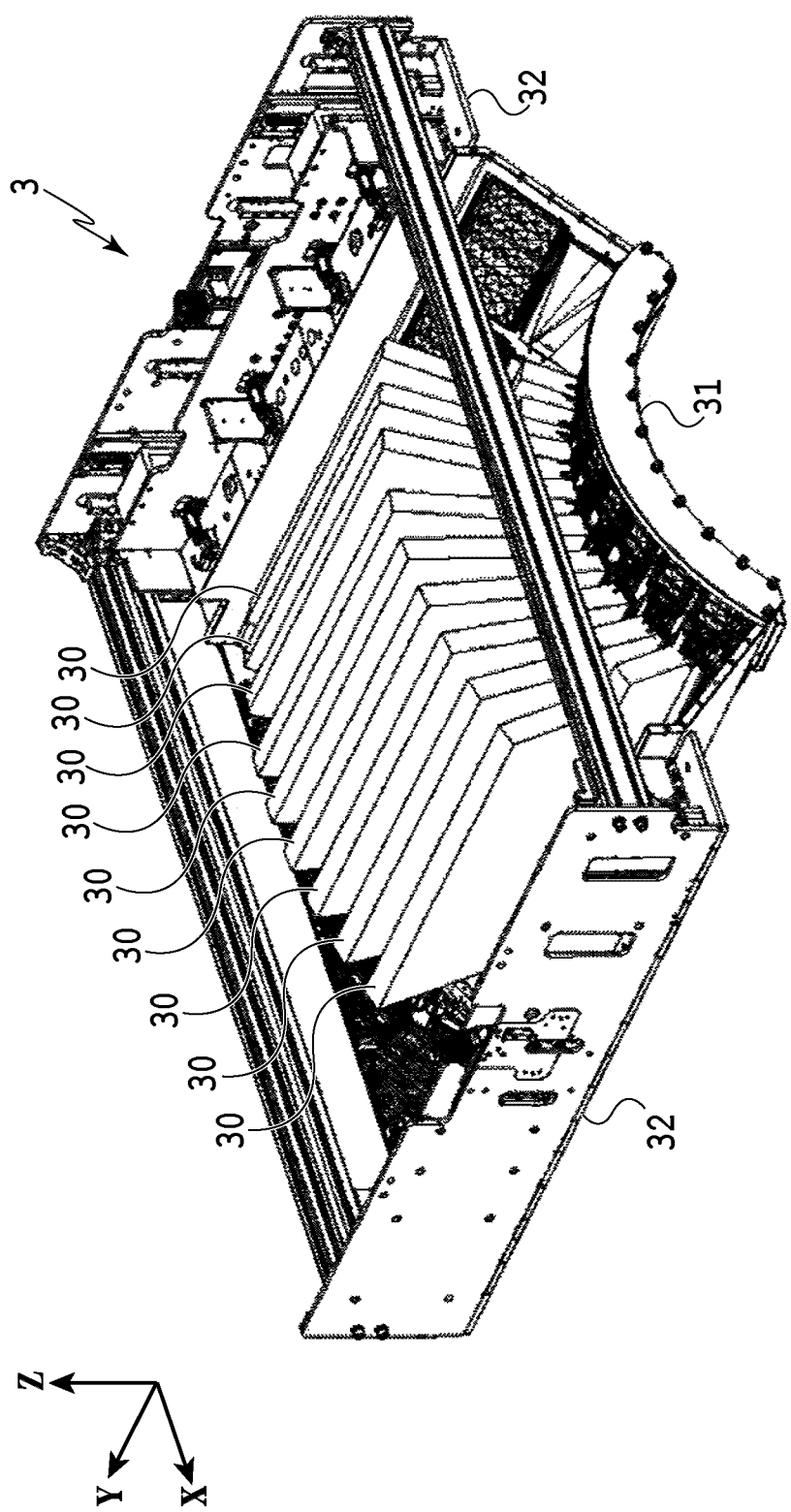
FIG. 2 is a perspective view of a printing section.

As illustrated in FIGS. 1 and 2, the printing section (printing unit) 3 includes multiple print heads 30 and a carriage 31. FIG. 2 is a perspective view of the printing section 3. The print heads 30 eject liquid ink to the transfer body 2 to form an ink image on the transfer body 2 as a print image.

In the present embodiment, each print head 30 is a full-line head extending in the Y direction and having ejecting ports arrayed in the range that covers the width of the image printing area of the print medium of the maximum usable size. The print head 30 has, at its lower surface, an ejection surface where the ejecting ports are formed. The ejection surface faces the surface of the transfer body 2 with a small gap (for example, several millimeters) in between. In the present embodiment, the transfer body 2 moves in a circulative fashion on a circular path. For this reason, the print heads 30 are disposed radially with the center of the transfer body 2 as the center point.

Inside each ejecting port is disposed an ejection-energy generating element for ejecting ink (hereinafter also referred to as an ejecting element). The ejecting element, for example, generates pressure inside the ejecting port to eject ink inside the ejecting port. Examples of the ejecting element include elements that eject ink by causing film boiling in ink using an electro-thermal converter to form a bubble, elements that eject ink using an electro-mechanical converter (piezo), and elements that eject ink utilizing electrostatic (heaters). From the viewpoint of high-speed and high-density printing, it is effective to use ejecting elements utilizing electro-thermal converters.

In the present embodiment, the printing section 3 has nine print heads 30. Each print head 30 ejects a different kind of ink. Different kinds of ink mean, for example, ink having different coloring materials, such as yellow ink, magenta ink, cyan ink, and black ink. One print head 30 ejects one kind of ink, but one print head 30 may eject multiple kinds of ink. In the case where the printing section 3 has multiple print heads 30 as described above, some of them may eject ink containing no coloring material (for example, liquid for improving image quality).

The carriage 31 supports the print heads 30. Each print head 30 is fixed to the carriage 31 at its end on the ejection surface side. This structure allows the gap between the ejection surface and the surface of the transfer body 2 to be maintained more precisely. The carriage 31 is movable being guided by guide members RL while holding the print head 30. In the present embodiment, the guide members RL are a pair of rail members apart in the X direction, extending in the Y direction. On both sides of the carriage 31 in the X direction are disposed sliding units 32. The sliding units 32, engaged with the guide members RL, slide along the guide members RL in the Y direction.

Figure 3:
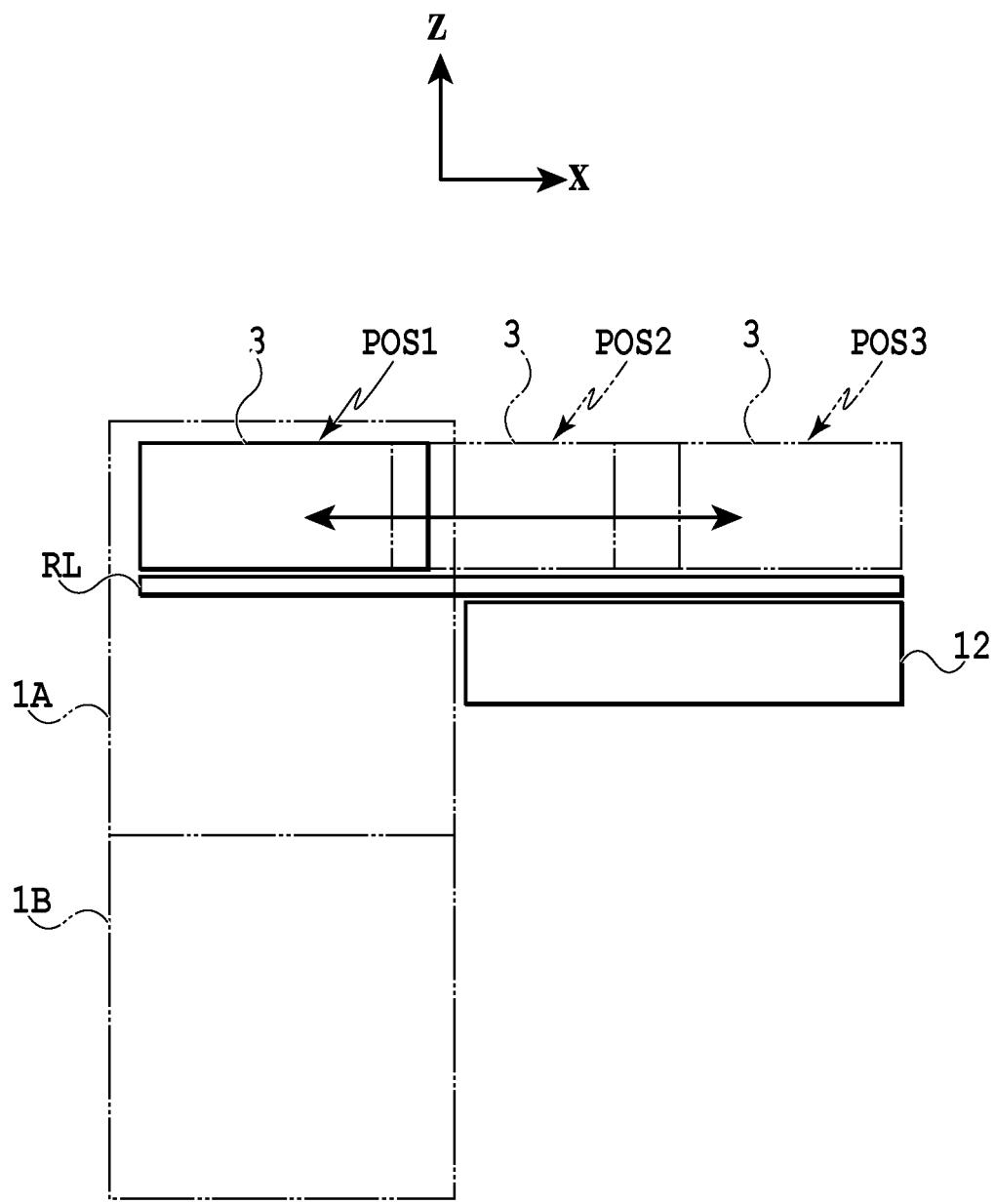
FIG. 3 is an explanatory diagram illustrating the movement of the printing section.

FIG. 3 is a diagram schematically illustrating the right side in FIG. 1, illustrating a state where the printing section 3 slides. At the rear of the image forming apparatus 1 is disposed a recovery unit 12. The recovery unit 12 has a recovery mechanism that recovers the ejection performance of the print head 30. Examples of the recovery mechanism include a cap mechanism for capping the ink ejection surfaces of the print heads 30, a wiper mechanism for wiping the ink ejection surfaces, and a suction mechanism for sucking ink inside the print heads 30 from the ink ejection surfaces using negative pressure.

The guide members RL extend from the sides of the transfer body 2 and run the length of the recovery unit 12. The printing section 3 is movable being guided by the guide members RL between an ejecting position POS1 indicated by the printing section 3 drawn with continuous lines and a recovery position POS3 indicated by the printing section 3 drawn with dashed lines, and the printing section 3 is moved by a not-illustrated drive mechanism.

The ejecting position POS1 is a position where the printing section 3 ejects ink to the transfer body 2 and where the ejection surfaces of the print heads 30 face the surface of the transfer body 2. The recovery position POS3 is a position where the printing section 3 retreats from the ejecting position POS1 and is positioned over the recovery unit 12. The recovery unit 12 is able to execute the recovery process for the print heads 30 when the printing section 3 is positioned at the recovery position POS3. In the present embodiment, it is possible to execute the recovery process also when the printing section 3 is in the course of moving toward the recovery position POS3 before reaching it. There is a preliminary recovery position POS2 between the ejecting position POS1 and the recovery position POS3. While the print heads 30 are moving from the ejecting position POS1 toward the recovery position POS3, the recovery unit 12 is able to execute a preliminary recovery process for the print heads 30 at the preliminary recovery position POS2.

<Transfer Unit>

The transfer unit 4 will be described with reference to FIG. 1. The transfer unit 4 includes a transfer cylinder 41 and an impression cylinder 42. These cylinders are rotators that rotate on the rotation axes extending in the Y direction and have cylindrical outer peripheral surfaces. In FIG. 1, the arc-shaped arrows drawn inside the transfer cylinder 41 and the impression cylinder 42 indicate their rotation directions. The transfer cylinder 41 rotates clockwise; the impression cylinder 42 rotates counterclockwise.

The transfer cylinder 41 is a support that supports the transfer body 2 on its outer peripheral surface. The transfer body 2 is disposed continuously or intermittently on the outer peripheral surface of the transfer cylinder 41 in the circumferential direction. In a case where a transfer body 2 is disposed continuously, the transfer body 2 is formed in an endless belt shape. In a case where transfer bodies 2 are disposed intermittently, the transfer bodies 2 are formed as multiple segments each in a belt shape having both ends. These segments may be arranged in an arc shape at an equal pitch on the outer peripheral surface of the transfer cylinder 41.

The rotation of the transfer cylinder 41 moves the transfer body 2 on a circular path in a circulative fashion. According to the rotation phase of the transfer cylinder 41, the positions of the transfer body 2 can be classified into a pre-ejection process area R1, an ejection area R2, post-ejection process areas R3 and R4, a transfer area R5, and a post-transfer process area R6. The transfer body 2 passes through these areas in a circulative fashion.

In the pre-ejection process area R1, a pretreatment is performed on the transfer body 2 before the printing section 3 ejects ink onto it, and the treatment is performed by the peripheral unit 5A. In the present embodiment, reaction liquid is applied to the transfer body 2 to improve image quality. In the ejection area R2, the printing section 3 ejects ink onto the transfer body 2 to form an ink image. In the post-ejection process areas R3 and R4, treatments are performed on the ink image after ink was ejected. In the post-ejection process area R3, the treatment is performed by the peripheral unit 5B; in the post-ejection process area R4, the treatment was performed by the peripheral unit 5C. In the transfer area R5, the transfer unit 4 transfers the ink image on the transfer body 2 to a print medium P. In the post-transfer process area R6, a posttreatment is performed on the transfer body 2 after transferring, and the treatment is performed by the peripheral unit 5D.

The outer peripheral surface of the impression cylinder 42 is pressed against the transfer body 2. The outer peripheral surface of the impression cylinder 42 has at least one grip mechanism for holding the leading end of the print medium P. Multiple grip mechanisms may be disposed so as to be apart from one another in the circumferential direction of the impression cylinder 42. While the print medium P is being conveyed in close contact with the outer peripheral surface of the impression cylinder 42, the ink image on the transfer body 2 is transferred to the print medium P when the print medium P is passing through the nip portion between the impression cylinder 42 and the transfer body 2.

<Peripheral Unit>

The peripheral units 5A to 5D are disposed around the transfer body 2. In the present embodiment, the peripheral units 5A to 5D are an application unit, suction unit, heating unit, and cleaning unit.

The application unit 5A is a mechanism that applies reaction liquid onto the transfer body 2 before the printing section 3 ejects ink onto it. The reaction liquid is a liquid containing a component that increases the viscosity of ink. The suction unit 5B is a mechanism that sucks a liquid component from the ink image on the transfer body 2 before transferring. The decrease in the liquid component in the ink image prevents blurring or the like of an image printed on the print medium P. The suction unit 5B includes, for example, a liquid absorbing member that comes into contact with the ink image and reduces the amount of the liquid component in the ink image.

The heating unit 5C is a mechanism that heats the ink image on the transfer body 2 before transferring. Heating the ink image melts the resin in the ink image, improving the transferability of the ink image to the print medium P. The cleaning unit 5D is a mechanism that cleans the surface of the transfer body 2 after transferring. The cleaning unit 5D removes ink remaining on the transfer body 2 and dust or the like on the transfer body 2.

<Supply Unit>

The supply unit 6 is a mechanism that supplies ink to the print heads 30 on the printing section 3. The supply unit 6 includes reserving units TK for reserving ink. The reserving unit TK may include a main tank and a sub-tank. Each reserving unit TK and the corresponding print head 30 communicate with each other through a flow path 6a, through which the reserving unit TK supplies the print head 30 with ink. The flow path 6a may be a flow path through which ink circulates between the reserving unit TK and the print head 30, and the supply unit 6 may include a pump or the like to circulate ink.

<Conveyance Section>

The conveyance section 1B feeds a print medium P stacked on the stacking unit to the transfer unit 4. An ink image is transferred (in other words, printed) on the print medium P fed to the transfer unit 4. After that, the conveyance section 1B discharges from the transfer unit 4 the printed product P' on which the ink image has been transferred. The conveyance section 1B includes a feeding unit (feeding unit) 7, multiple conveyance cylinders 8 and 8a two sprockets 8b and a chain 8c, and a collection unit 8d. In FIG. 1, the arc-shaped arrows drawn inside the conveyance cylinders 8 and 8a described later in the conveyance section 1B indicate the rotation directions of the conveyance cylinders 8 and 8a, and the arrows drawn outside indicate the conveying path of the print medium P or the printed product P'. The print medium P is conveyed from the feeding unit 7 to the transfer unit 4, and the printed product P' is conveyed from the transfer unit 4 to the collection unit 8d. The feeding unit 7 side may be called the upstream in the conveyance direction, and the collection unit 8d side may be called the downstream.

The feeding unit 7 includes the stacking unit on which multiple print media P are stacked and also includes a feeding mechanism that feeds the print media P from the stacking unit one sheet by one sheet to the most upstream conveyance cylinder 8. Each conveyance cylinder 8 or 8a is a rotator that rotates on the rotation axis extending in the Y direction and has a cylindrical outer peripheral surface. On the outer peripheral surface of each conveyance cylinder 8 or 8a is disposed at least one grip mechanism that holds the leading end of the print medium P (or the printed product P'). For each grip mechanism, the gripping operation and the releasing operation are controlled so that the print medium P can be handed over between two adjoining conveyance cylinders.

The two conveyance cylinders 8a are for reversing the print medium P. In the case where duplex printing is performed on a print medium P, the impression cylinder 42 does not hand over the print medium P, on the surface of which an image has been transferred, to the conveyance cylinder 8 adjoining downstream, but hands over it to the conveyance cylinder 8a. The front and buck surfaces of the print medium P are reversed through the two conveyance cylinders 8a, and the print medium P is handed over to the impression cylinder 42 again via the conveyance cylinder 8 upstream of the impression cylinder 42. With this operation, the back surface of the print medium P faces the transfer cylinder 41, and an ink image is transferred to the back surface.

The chain 8c is put between the two sprockets 8b. One of the two sprockets 8b is a driving sprocket, and the other is a driven sprocket. The rotation of the driving sprocket makes the chain 8c travel in a circulative fashion. The chain 8c has multiple grip mechanisms apart from one another in the length direction. The grip mechanism grips an end of the printed product P'. The conveyance cylinder 8 located at the downstream end hands over the printed product P' to a grip mechanism of the chain 8c. The printed product P' gripped by the grip mechanism is conveyed by the travel of the chain 8c to the collection unit 8d, where the gripping is released. With this operation, the printed product P' is stacked in the collection unit 8d.

<Controller Unit>

Figure 4:
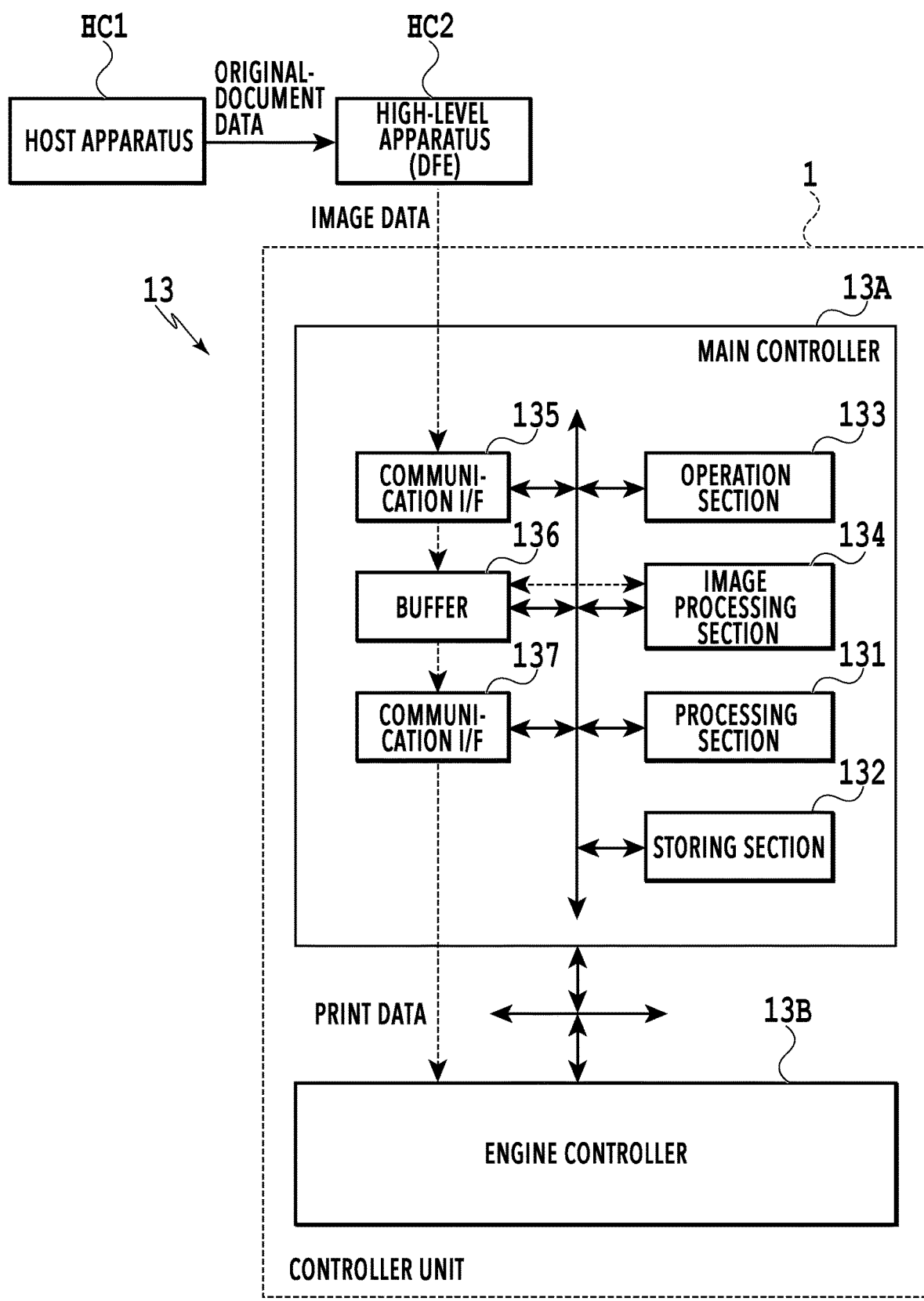
FIG. 4 is a block diagram illustrating the hardware configuration of the control system of the image forming apparatus.
Figure 5:
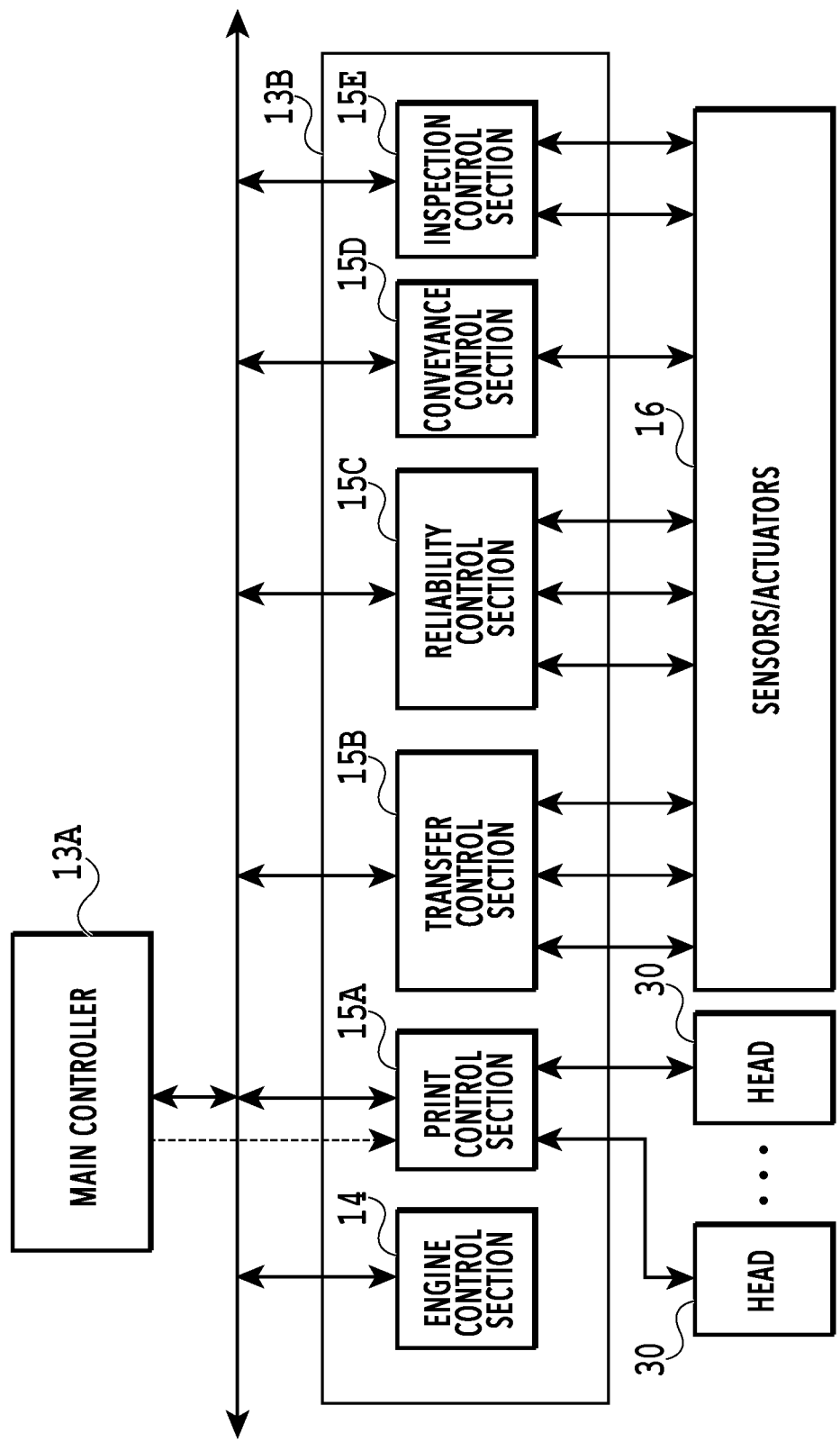
FIG. 5 is a block diagram illustrating the hardware configuration of the engine controller of the image forming apparatus.

Next, a description will be provided for a controller unit 13 of the image forming apparatus 1 will be described. FIGS. 4 and 5 are block diagrams illustrating the hardware configuration of the controller unit 13 of the image forming apparatus 1. The controller unit 13 is communicably connected to a higher-level apparatus (digital front-end processor, or DEF) HC2. The higher-level apparatus HC2 is communicably connected to a host apparatus HC1.

The host apparatus HC1 generates or stores original-document data on which print images are based. Here, original-document data is generated in a form of an electronic file, such as a document file or an image file, for example. This original-document data is transmitted to the higher-level apparatus HC2, which converts the received original-document data into data in a data format that can be handled by the controller unit 13 (for example, RGB data which expresses images in RGB). The data after conversion is transmitted from the higher-level apparatus HC2 to the controller unit 13 as image data. The controller unit 13 starts a print operation based on the received image data.

In the present embodiment, the controller unit 13 mainly includes a main controller 13A and an engine controller 13B. The main controller 13A includes a processing unit 131, storing unit 132, operation unit 133, image processing unit 134, communication I/F (interface) 135, buffer 136, and communication I/F 137 and functions as the feeding instruction apparatus of the present embodiment. The engine controller 13B functions as a feeding apparatus of the present embodiment. The processing unit 131 and the storing unit 132 make up a computer of the image forming apparatus 1.

The processing unit 131 is a processor, such as a CPU. The processing unit 131 executes programs stored in the storing unit 132 to control the entire main controller 13A. The storing unit 132 is a storage device, such as RAM, ROM, a hard disk, and SSD. The storing unit 132 stores programs executed by the CPU executes and data. The storing unit 132 provides a work area that the CPU uses when executing processes. The operation unit 133 is an input device, such as a touch panel, keyboard, and mouse, for example, and receives instructions from the user.

The image processing unit 134 is, for example, an electronic circuit having an image processing processor. The buffer 136 includes, for example, RAM, a hard disk, or SSD. The communication I/F 135 communicates with the higher-level apparatus HC2 and the engine controller 13B.

The arrows with dashed lines in FIG. 4 indicate the flow of image data processing. Image data received from the higher-level apparatus HC2 via the communication I/F 135 is stored in the buffer 136. The image processing unit 134 reads the image data from the buffer 136 and performs predetermined image processing on the read image data. The image processing unit 134 stores the processed image data into the buffer 136 again. The image data after image processing stored in the buffer 136 is transmitted to the engine controller 13B via the communication I/F 137 as print data to be used by the print engine.

As illustrated in FIG. 5, the engine controller 13B includes an engine control unit 14, print control unit 15A, transfer control unit 15B, reliability control unit 15C, conveyance control unit 15D, and inspection control unit 15E.

Using these control units, the engine controller 13B obtains detection results by sensors and actuators 16 included in the image forming apparatus 1 and controls driving of each unit. Each control unit included in the engine controller 13B includes a processor, such as CPU, a storage device, such as RAM and ROM, and an interface with external devices. Note that the above partition of the engine controller 13B into the control units is an example, and that some of the control may be further divided into smaller control units. Conversely, some of the illustrated multiple control units may be integrated into a single control unit, and the control functions of those may be executed by the single control unit.

In the present embodiment, the control units included in the engine controller 13B perform the following functions. To be specific, the engine control unit 14 performs the overall control of the engine controller 13B. The print control unit 15A converts the print data received from the main controller 13A into data in a data format suitable for driving the print heads 30, such as raster data. The print control unit 15A performs ejection control for driving printing elements in each print head 30 to eject ink from the ejecting ports. The transfer control unit 15B controls the application unit 5A, suction unit 5B, heating unit 5C, and cleaning unit 5D. The reliability control unit 15C controls the supply unit 6, the recovery unit 12, and the drive mechanism that moves the printing section 3 between the ejecting position POS1 and the recovery position POS3 illustrated in FIG. 3. The conveyance control unit 15D controls the conveyance section 1B. The inspection control unit 15E controls an inspection unit 9B and an inspection unit 9A. Note that the sensors of the sensors and actuators 16 include sensors that detect the positions and speeds of movable portions, sensors that detect temperature, and an image capturing element. The actuators include motors, electromagnetic solenoids, and electromagnetic valves.

Figure 6:
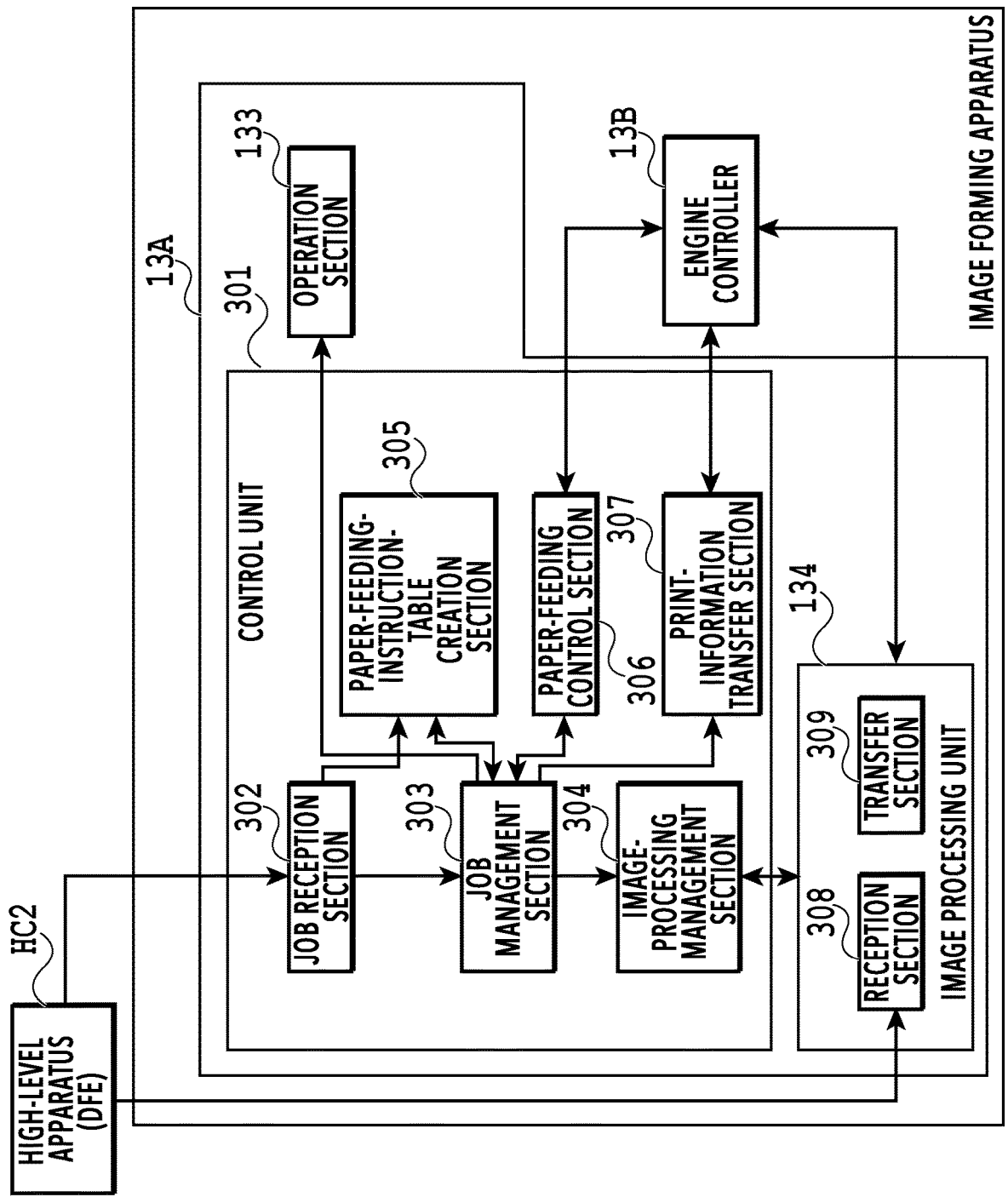
FIG. 6 is a block diagram illustrating the functional configuration of a main controller.

FIG. 6 is a block diagram illustrating the functional configuration of the main controller 13A in the controller unit 13 illustrated in FIG. 4.

The controller unit 13 includes the main controller 13A and the engine controller 13B as described above. The main controller 13A includes a control unit 301, image processing unit 134, and operation unit 133.

The control unit 301 analyzes print job information and page information based on a print job which is reception data from the higher-level apparatus HC2 and performs predetermined data processing. The control unit 301 transfers commands created by a paper-feeding control section 306 and print-information transfer section 307 described later to the engine controller 13B based on the foregoing analysis results and instructions from the operation unit 133. The paper-feeding control section 306 issues instructions, such as the number of sheets to be fed, and receives a paper-feeding notification from the engine controller 13B for every single sheet. The print-information transfer section 307 transfers print information based on page information including the order of pages to be printed.

Meanwhile, the operation unit 133 receives operation instructions and displays the state of the apparatus. The engine controller (feeding unit) 13B controls the feeding operation by the paper-feeding unit 7 as an engine, following paper-feeding instructions (feeding instructions) sent out from the foregoing control unit 301. The engine controller 13B further controls the print heads 30 based on the print data transmitted from the main controller 13A to cause the print heads 30 to form images on sheets transferred.

The control unit 301 includes units that control the functions to execute the above processes, such as a job reception unit (reception unit) 302, a job management section 303, an image-processing management unit 304, a paper-feeding-instruction-table creation unit (creation unit) 305, the paper-feeding control section 306, and the print-information transfer section 307.

The job reception unit 302 receives job information data and page information data from the higher-level apparatus HC2 and analyzes and stores those pieces of data.

The job management section 303 determines setting of print information and the transmission order of the print data, using the data stored by the job reception unit 302. Based on the determined results, the job management section 303 further issues instructions to the print-information transfer section 307 and controls the engine controller 13B. Based on a paper-feeding instruction table (feeding instruction table) created by the paper-feeding-instruction-table creation unit 305 described later, the job management section 303 issues an instruction (paper-feeding instruction) concerning paper feeding to the paper-feeding control section 306.

The image-processing management unit 304 manages the image processing instructed by the job management section 303. The paper-feeding-instruction-table creation unit 305 receives page information at the page reception time at the job reception unit 302 and creates and updates the paper-feeding instruction table.

The paper-feeding control section 306 receives a paper-feeding instruction from the job management section 303 and transmits a command for the paper-feeding instruction to the engine controller 13B. The paper-feeding control section 306 receives a command for a paper-feeding notification from the engine controller 13B every time the engine controller 13B feeds a sheet of paper and notifies the job management section 303 of the state of paper feeding.

The print-information transfer section 307 transfers the print setting information instructed by the job management section 303 to the engine controller 13B.

The image processing unit 134 receives bitmap data for printing from the higher-level apparatus HC2 and writes the data into a reception unit 308. Then, the image processing unit 134 performs image processing using the bitmap data as input and writes the processed print data into a transfer unit 309. The transfer unit 309 transfers the print data subjected to the foregoing image processing to the engine controller 13B.

Here, a description will be provided for a problem that the present embodiment addresses. In the present embodiment, the engine controller 13B performs paper feeding on the basis of the paper-feeding instruction transmitted to the engine controller 13B. Note that when the engine controller 13B receives a paper-feeding instruction, the engine controller 13B feeds sheets to the conveyance section continuously without waiting for the completion of printing for the sheets that have been already fed. Then, in order to execute printing based on a print job without stopping in the middle of the operation, by the time the paper feeding based on a paper-feeding instruction previously transmitted to the engine controller 13B is completed, the next paper-feeding instruction needs to arrive at the engine controller 13B. In the case where after the user sends a print job to the image forming apparatus 1, the user wants to stop the printing based on the print job in the middle of the operation, the user can execute a cancel operation. Specifically, the user can execute the cancel operation on the operation unit included in the host apparatus HC1 or the higher-level apparatus HC2. In the case where the host apparatus HC1 or the higher-level apparatus HC2 receives a cancel operation, it transmits a cancel instruction to the control unit 301. In response to the reception of the cancel instruction, the control unit 301 stops transmitting paper-feeding instructions and print data to the engine controller 13B.

For example, assume that to perform printing on multiple sheets, a paper-feeding instruction for one sheet is continuously transmitted to cause the engine controller 13B to continuously perform paper feeding. In this case, in the case where the arrival of the paper-feeding instruction is late for the engine controller 13B, the engine controller 13B may stop paper feeding, and a maintenance process may be executed in some cases. Specifically, even in a case where the first paper-feeding instruction and the second paper-feeding instruction are sequentially transmitted to the engine controller 13B, if the second paper-feeding instruction does not arrive by the time the paper feeding based on the first paper-feeding instruction is completed, the maintenance process is executed before the paper feeding based on the second paper-feeding instruction. In other words, the engine controller 13B stops paper feeding and executes the maintenance process on the basis that the paper feeding based on the first paper-feeding instruction has been completed in the state where the engine controller 13B has not received the second paper-feeding instruction. Note that the maintenance process includes the process executed by the cleaning unit 5D and the recovery process performed by the recovery unit 12 to maintain and recover the ejection performance of the print heads. In addition, for example, also in a case where although the arrival of the paper-feeding instruction is not late for the engine controller 13B, the instruction is not reflected immediately, the engine controller 13B may stop paper feeding in some cases. In particular, in the configuration in which the control unit 301 and the engine controller 13B are connected via an interface as in the present embodiment, the above situation is likely to occur, unlike the configuration in which the control unit 301 and the engine controller 13B are connected via an internal bus.

In the present embodiment, the maintenance process is started, such as the cleaning process and the capping process for the print heads, on the basis that paper feeding has stopped, as described above. In addition, also before printing is resumed, a process for releasing the cap for the print heads and a process for accelerating the rotation of the conveyance cylinders 8 are performed. In other words, to complete the remaining print operation that has been stopped in the middle of the operation, the control unit 301 needs to wait until those processes are completed.

Thus, in the configuration in which the paper-feeding instruction for one sheet is continuously issued to cause the engine controller 13B to perform paper feeding, there is a problem that the completion of printing may be delayed in the foregoing circumstances.

On the other hand, for example, assume that to perform printing on multiple sheets, the paper-feeding instruction for all the sheets is collectively issued at one time to cause the engine controller 13B to perform paper feeding. In this case, paper feeding based on the paper-feeding instruction that arrived at the engine controller 13B cannot be cancelled in some cases, for example, even if the user performs the cancel operation in the middle of the paper feeding. Thus, in the configuration in which the paper-feeding instruction for all the sheets is collectively issued to cause the engine controller 13B to perform paper feeding, there is a problem that in a case where the user performs the cancel operation, unnecessary paper feeding is performed.

Here, in the present embodiment, a description will be provided for a configuration for transmitting the paper-feeding instruction appropriately.

Figure 7:
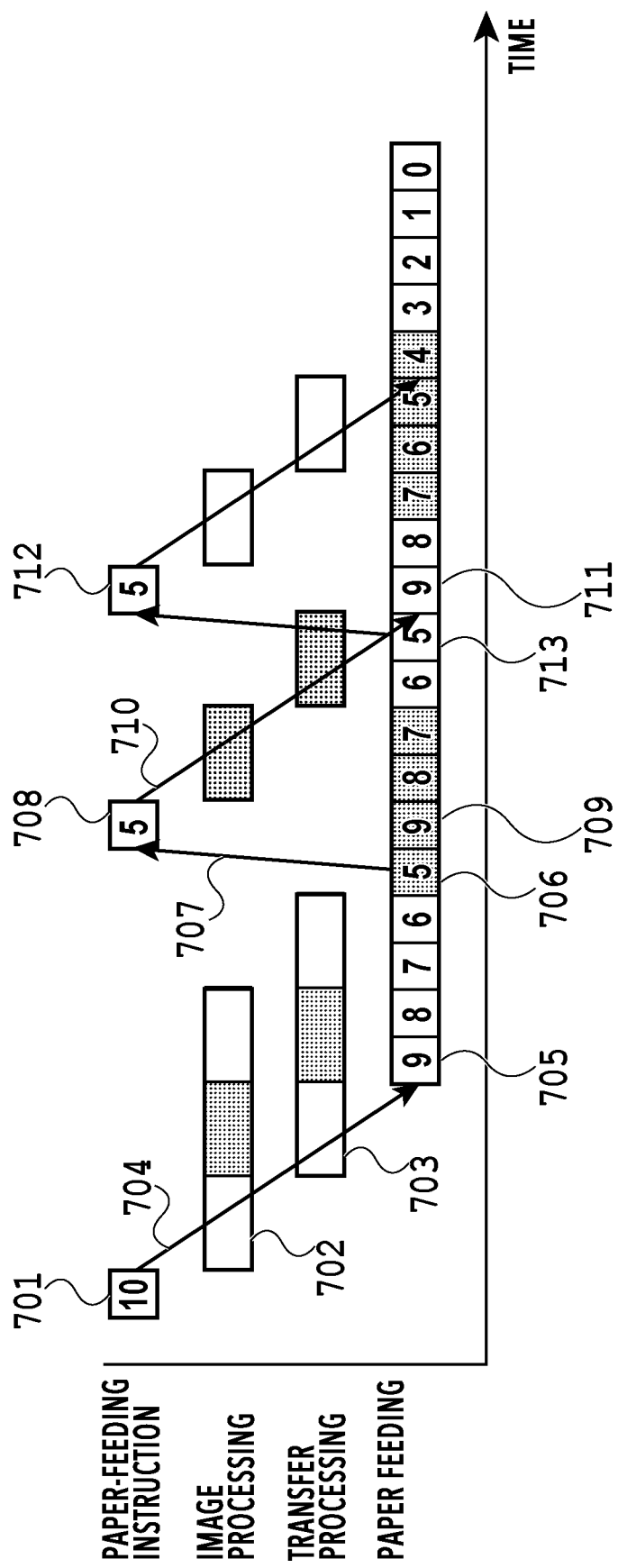
FIG. 7 is a diagram illustrating an example of operation from the paper-feeding instruction to paper feeding.

FIG. 7 is a diagram illustrating an example of operation from the paper-feeding instruction to the paper-feeding operation when a print job is performed. In this example, for a print job that instructs printing of four copies of a five-page document, a first paper-feeding instruction is issued, and then additional paper-feeding instructions (second and subsequent paper-feeding instructions) are issued in the middle of the operation to eventually perform printing of 20 sheets.

As illustrated in FIG. 7, before printing, four processes are executed: the paper-feeding instruction, image processing, transfer processing, and paper feeding. In FIG. 7, on the left side of the vertical axis are written the process items, and the rectangular frames drawn on the right side of the vertical axis indicate execution timings of the corresponding processes. Here, the lateral width of a rectangular frame (the length along the time axis) indicates the time period taken for the corresponding process written on the left side of the frame. Specifically, the lateral width of a frame corresponding to the paper-feeding instruction indicates the time period taken for one instruction from the paper-feeding control section 306 to the engine controller 13B. The lateral width of a frame corresponding to each of the image processing and the transfer processing indicates the processing time per page. In addition, the lateral width of a frame corresponding to the paper feeding indicates the time interval of paper feeding performed by the feeding unit 7 one sheet by one sheet.

After the paper-feeding instruction 701 arrives at the engine controller 13B, and the transfer processing of the image data corresponding to the number of sheets to be fed by the paper-feeding instruction 701 is completed, the feeding unit 7 performs paper feeding according to the instruction of the engine controller 13B. A number written in each frame corresponding to the paper-feeding instruction indicates the number of sheets designated by the paper-feeding instruction. For example, the paper-feeding instruction 701 instructs paper feeding of ten sheets. In the example illustrated in FIG. 7, since four copies are printed per page, the paper-feeding instruction for ten sheets instructs paper feeding up to the second copy of page 3.

The paper-feeding instruction 701 is the first paper-feeding instruction, and thus, paper feeding is not started at the time of the instruction. The paper-feeding instruction 701 is followed by the image processing 702 and the transfer processing 703, paper feeding starts at the timing indicated by the tip of the arrow 704. Here, the number written in each frame of paper feeding indicates the number of sheets waiting to be fed (the number of feed-waiting sheets). Note that the number of sheets waiting to be fed means the number of sheets that have not been fed yet of the number of sheets to be fed based on the paper-feeding instruction already received. For example, at the paper feeding 705, a first sheet has been fed in response to the paper-feeding instruction 701 for ten sheets, and thus, the number of feed-waiting sheets is nine. Every time one sheet is fed, the engine controller 13B gives a paper-feeding notification to the paper-feeding control section 306. Based on this paper-feeding notification, the job management section 303 manages the number of feed-waiting sheets. In other words, every time one sheet is fed, the number of feed-waiting sheets is decremented.

In this example, a job involving paper feeding of 20 sheets in total has been inputted. Thus, the paper feeding of ten sheets designated by the initial paper-feeding instruction 701 cannot cover all paper feedings, and additional paper feeding is necessary. Here, since a time lag may occur from the time a paper-feeding instruction is issued to the time paper feeding is actually performed, as described above, in a case where an additional paper-feeding instruction is issued just before the number of feed-waiting sheets becomes zero, the paper-feeding operation based on the additional paper-feeding instruction may not be in time, so that continuous paper feeding may not be achieved in some cases. Thus, an additional paper-feeding instruction needs to be transmitted before the number of feed-waiting sheets becomes zero. Here, the paper-feeding timing 706 at which the number of feed-waiting sheets becomes 5 is set as an additional paper-feeding timing, an additional paper-feeding instruction is issued at this timing. A method of determining the number of feed-waiting sheets for an additional paper-feeding timing will be described later with reference to FIG. 11.

When the process reaches the paper-feeding timing 706, a paper-feeding notification is released, and the paper-feeding instruction 708 is issued at the timing indicated by the tip end of the arrow 707. This paper-feeding instruction 708 instructs additional paper-feeding of five sheets. After the paper-feeding instruction 708 is issued, five designated by the paper-feeding instruction 708 is added to five which is the number of feed-waiting sheets at the paper-feeding timing 706, and the number of feed-waiting sheets becomes ten. However, since the image forming apparatus is running while the additional paper-feeding instruction is being issued, paper feeding is continuously being performed. For this reason, when the additional paper-feeding instruction is issued, the number of feed-waiting sheets becomes nine.

The paper feeding instructed by the additional paper-feeding instruction 708 is started at the paper feeding 711 indicated by the tip end of the arrow 710. With this operation, the paper feeding of ten sheets designated by the paper-feeding instruction 701 is followed by the paper feeding designated by the paper-feeding instruction 708 continuously. Similarly, the paper-feeding instruction 712 instructs an additional paper-feeding. The operation described above makes it possible to perform continuous paper feeding of 20 sheets and print an image on each sheet.

As described above, although each paper-feeding instruction transmitted in the present embodiment is not a paper-feeding instruction for one-time paper feeding of all the sheets used for printing according to a received print job, it is a paper-feeding instruction for paper feeding of multiple sheets. Such a paper-feeding instruction is transmitted multiple times. These paper-feeding instructions transmitted as described above solve the foregoing problem and achieve an appropriate paper feeding. Specifically, it prevents a pause of printing and reduces the number of wasteful sheets in the case of cancellation.

FIG. 8 is a diagram illustrating an example of a paper-feeding instruction table 800 created by the paper-feeding-instruction-table creation unit 305. This table is created for each set of continuous paper feedings. Thus, even for one print job, in a case where paper feeding is interrupted due to the delay of page reception or the like, another table may be created.

The paper-feeding number 801 indicates the number of each paper-feeding instruction counted from a paper-feeding halt state and indicates the order of paper-feeding instructions. The paper-feeding timing (feeding timing) W802 indicates the number of sheets waiting to be fed at the timing when an additional paper-feeding instruction is to be issued for additional paper feeding. The numbers of feed-waiting sheets indicated by 706 and 713 in FIG. 7 (5 for both cases)

correspond to the paper-feeding timing W. The number of sheets to be additionally fed A803 indicates the number of sheets to be additionally fed according to the additional paper-feeding instruction. The numbers of sheets designated by the additional paper-feeding instruction written at 708 and 712 in FIG. 7 (5 for both cases) correspond to the number of sheets to be additionally fed A803.

At a first paper-feeding, the number of sheets designated by the paper-feeding instruction is set to the number obtained by adding the paper-feeding timing W802 and the number of sheets to be additionally fed A803. In FIG. 7, the number of sheets designated by the paper-feeding instruction at 701 (10) corresponds to the number of sheets in the first paper-feeding. The reason why the number of sheets to be fed in the first paper-feeding is set to the sum of the paper-feeding timing W802 and the number of sheets to be additionally fed A803 is that in the case where the first paper-feeding instruction is issued with only the number of sheets to be additionally fed A803, there is a possibility that the number of feed-waiting sheets is less than the number set as the paper-feeding timing W802.

For example, in the case where the number set in the first paper-feeding instruction is 5, and the paper-feeding timing W is set to 5, the number of feed-waiting sheets is already 4 when paper feeding starts. This means that the number of feed-waiting sheets is below the paper-feeding timing (5), and thus an additional paper-feeding instruction is not issued. In this case, paper-feeding operation stops when paper feeding in the number of sheets to be fed designated at the first instruction (5) is completed, and thus continuous paper feeding cannot be achieved. Thus, to achieve continuous paper feeding, it is necessary to ensure that the number of feed-waiting sheets is more than equal to the paper-feeding timing W802. For this reason, the sum of the paper-feeding timing W802 and the number of sheets to be additionally fed A803 is set at the first paper-feeding instruction.

The paper-feeding completion flag F804 shown in FIG. 8 indicates whether the paper-feeding instruction has been already issued. If the instruction has been already issued, the paper-feeding completion flag F804 is TRUE; if not, it is FALSE.

The example of FIG. 7 illustrates a case where the paper-feeding timing W802 and the number of sheets to be additionally fed A803 in this table 800 are not different. In other words, FIG. 7 illustrates a case where there is no change in page setting such as the sheet size and resolution of each page predetermined in the print job, and the time period taken for the image processing and the transfer processing is always the same. In such a case, it is not necessary to create a table in particular. However, as in the examples illustrated in FIG. 9 and FIGS. 10A to 10C described later, in a situation where the page setting is changed in the middle of the operation, if the paper-feeding timing W802 and the number of sheets to be additionally fed A803 are always set to the same numbers, continuous paper feeding may be interrupted. Thus, in order to keep printing with continuous paper feeding and reduce the number of sheets printed after cancellation, elements of the paper-feeding instruction table 800 need to be dynamically created.

Figure 9:
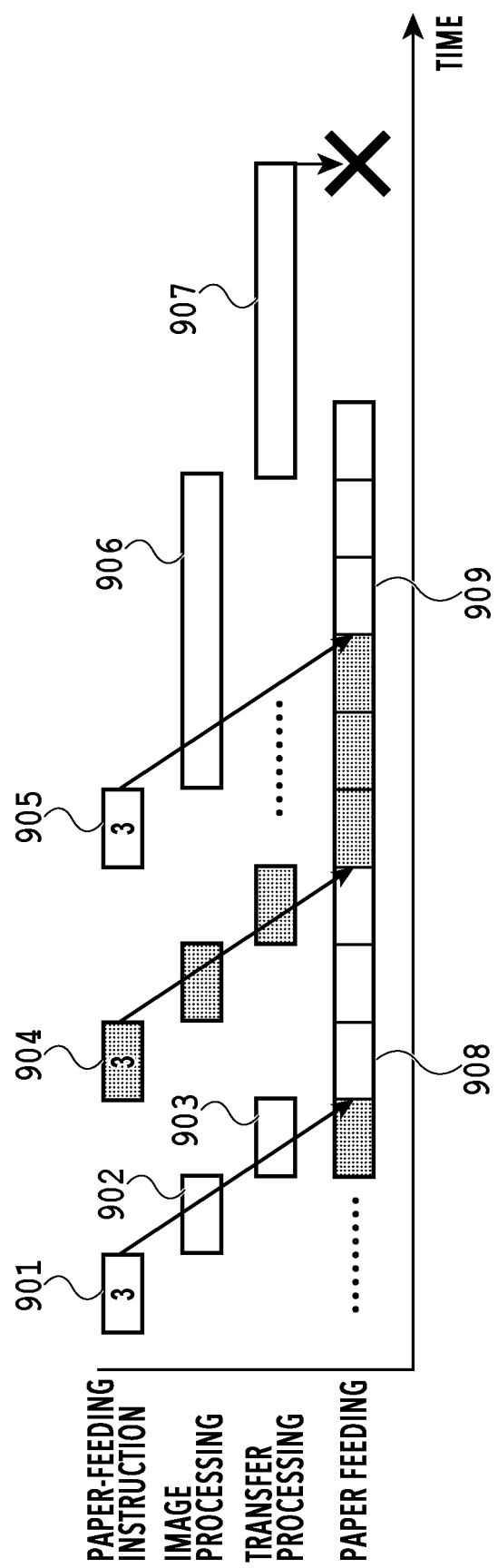
FIG. 9 is a diagram illustrating an example where processing is not in time for paper feeding.

FIG. 9 is a diagram illustrating an example that requires a table to be created dynamically. Here, the paper-feeding instruction 901 gives a paper-feeding instruction for additional three sheets to the paper feeding in progress. Once a paper-feeding operation starts, it is performed continuously at regular intervals. In the case where processing time is short such as the image processing 902 and the transfer processing 903, the transfer processing 903 is completed by the time the paper feeding 908 according to the added paper-feeding instruction 904 starts. Also, for the paper-feeding instruction 904, since there is no change in the number of sheets designated by the paper-feeding instruction and the time periods taken for the image processing and the transfer processing, the process according to the paper-feeding instruction 904 is performed in the same way as for the previous paper-feeding instruction 901.

For the additional paper-feeding instruction 905, there is no change in the number of sheets designated by the paper-feeding instruction, but the time periods taken for the image processing 906 and the transfer processing 907 are long. In this case, the completion of the transfer processing 907 is not in time for the start of the paper feeding 909 based on the paper-feeding instruction 905. When a paper-feeding instruction arrives at the engine controller 13B, paper feeding is performed whether the transfer processing 907 is completed or not. For this reason, in the case where the transfer processing has not finished when paper feeding is started, blank sheets will be discharged without printing. Thus, the paper-feeding instruction needs to be issued in time for the printing process. Specifically, the processing time necessary from the paper-feeding instruction 905 to the completion of the transfer processing 907 needs to be set before the start of the paper feeding 909 corresponding to the paper-feeding instruction 905. The number of sheets to be fed corresponding to this processing time is determined to determine the paper-feeding timing W.

Figure 10A:
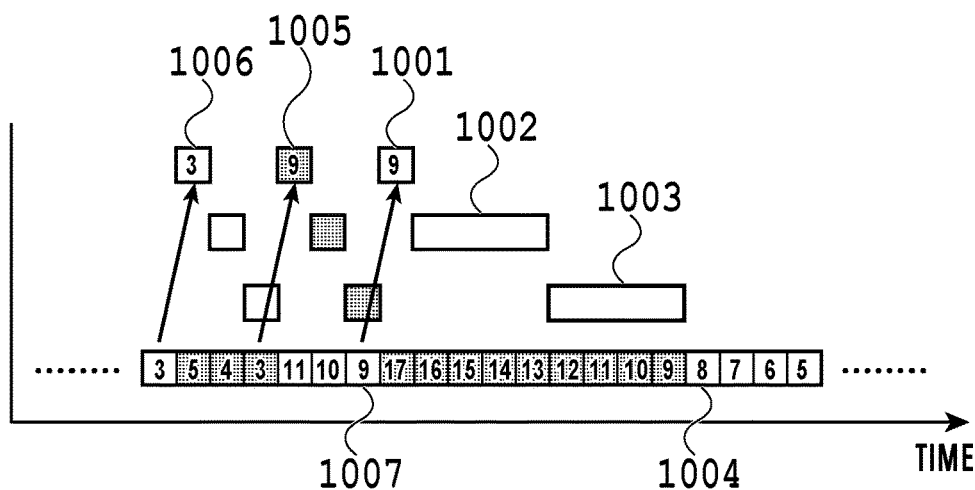
FIGS. 10A to 10C are diagrams illustrating other examples of operation from the paper-feeding instruction to paper feeding.
Figure 10B:
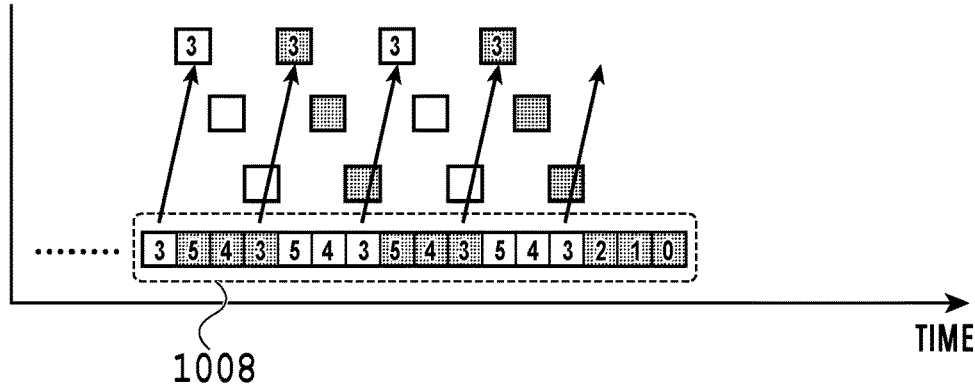
Figure 10C:
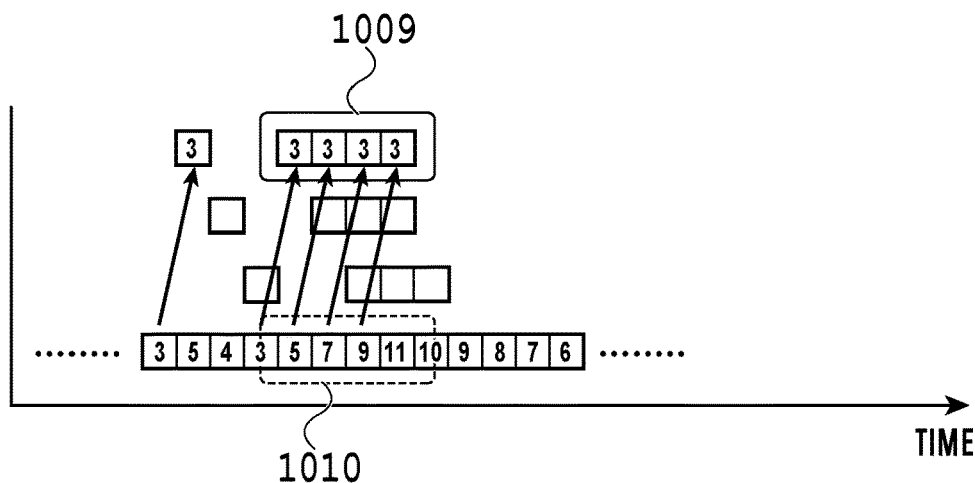

FIGS. 10A to 10C are diagrams illustrating that the number of sheets to be additionally fed A described above need to be increased according to the length of the processing time required from the start of the paper-feeding instruction 905 to the completion of the transfer processing 907. FIG. 10A is a diagram illustrating a process of setting the number of sheets to be fed to make the processes concerning the images to be printed (processes from the start of the paper-feeding instruction to the completion of the transfer processing) be in timing for the paper feeding 1004 performed according to the additional paper-feeding instruction 1001.

As illustrated in FIG. 10A, paper feeding of nine sheets is necessary from the start of the paper-feeding instruction to the completion of the transfer processing. Thus, the paper-feeding timing W to perform the paper-feeding instruction 1001 is 9. Accordingly, the number of sheets to be fed set in the paper-feeding instruction 1006, which is 3, is increased to 9 in the paper-feeding instruction 1005. In other words, the number of sheets to be fed designated by the paper-feeding instruction 1005 is controlled based on the processes concerning the images to be printed on the sheets to be fed based on the paper-feeding instruction 1001 (the image processing 1002 and the transfer processing 1003). As a result, the processes from the start of the paper-feeding instruction 1001 to the completion of the transfer processing 1003 can be completed by the time the paper-feeding operation performed based on the paper-feeding instruction 1005 finishes, and thus printing can be performed continuously without an interruption before or after the paper feeding 1004.

In contrast, in an example where the number of sheets to be additionally fed A is kept constant (3) without being increased as illustrated in FIG. 10B, the number of feed-waiting sheets does not become 9 during the paper feeding surrounded by the dashed line 1008. Consequently, in a case where the time periods taken for the image processing and the transfer processing are longer, if only the paper-feeding timing W is increased to 9 without increasing the number of sheets to be additionally fed A, a situation where the paper-feeding instruction cannot be issued occurs.

A conceivable method of increasing the number of feed-waiting sheets without increasing the number of sheets to be additionally fed A is shortening the time interval between paper-feeding instructions as the paper-feeding instruction indicated in the dashed-line frame 1009 in FIG. 10C. If the paper-feeding instruction indicated in the dashed-line frame 1009 is performed as described above, it may be possible to increase the number of feed-waiting sheets in paper feeding as indicated in the dashed-line frame 1010. However, to issue paper-feeding instructions continuously, the time interval longer than or equal to a certain length needs to be kept between the paper-feeding instructions due to limitations concerning the performance of the engine. Consequently, it is impossible to shorten the time intervals between paper-feeding instructions as illustrated in FIG. 10C. Thus, in a case of receiving a page the processing time for which is long, the number of sheets to be additionally fed A needs to be increased, as illustrated in FIG. 10A.

Next, the process executed when a print job is outputted will be described based on the flowcharts of FIGS. 11 to 14. Note that description will be based on an example of a case where a print job instructing the paper-feeding operation shown in FIG. 15 is received.

The print job in this example is one instructing printing of four copies of a nine-page document, and the time periods taken for the image processing and the transfer processing from page 4 to page 6 are set shorter than those for the other pages due to the difference in sheet size and other factors. In FIG. 15, the lateral length of each rectangular frame (the lateral width) corresponds to the time as in FIG. 7. Here, the numbers written in the page reception indicate page numbers. For example, 1601 indicates the reception of page information on page 1, and 1602 indicates page information on page 9.

Figure 15:
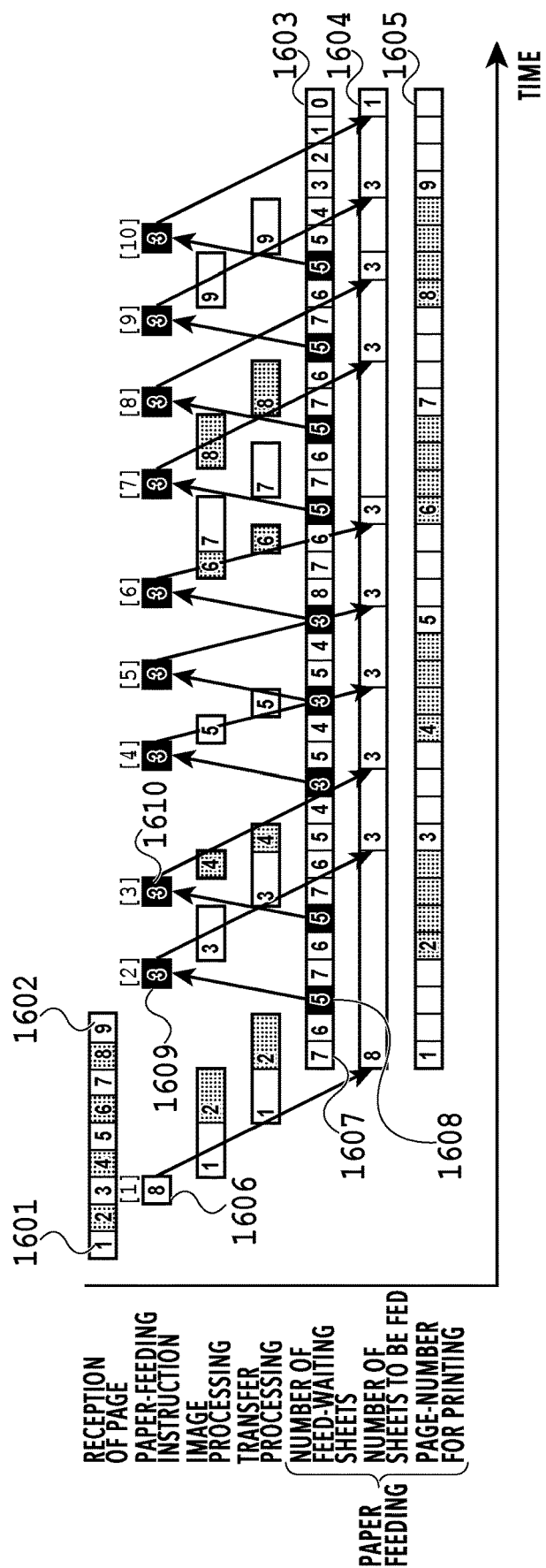
FIG. 15 is a diagram illustrating a specific example of operation from a paper-feeding instruction to paper feeding.

In FIG. 15, paper feeding is illustrated using the three items indicated by 1603, 1604, and 1605. In the item 1603, the lateral width of a rectangular frame indicates paper feeding time for one sheet, and the number in each frame indicates the number of feed-waiting sheets as the number indicated by 705 and the like in FIG. 7 does. In the item 1604, the lateral width of a rectangular frame indicates the paper feeding time taken for each paper-feeding instruction, and the number in each frame indicates the number of sheets to be fed corresponding to the paper feeding time. In the item 1605, the lateral width of a rectangular frame indicates the paper-feeding operation time for one sheet. The number in each frame indicates the page number of the page to be printed on each fed sheet, and a rectangular without a number means that the page of the same page number as in the preceding frame is to be printed in the rectangular. In the example illustrated in FIG. 15, printing of four copies is performed for every page, and thus, four consecutive white frames and four consecutive shaded frames mean printing of the respective same pages.

Figure 11:
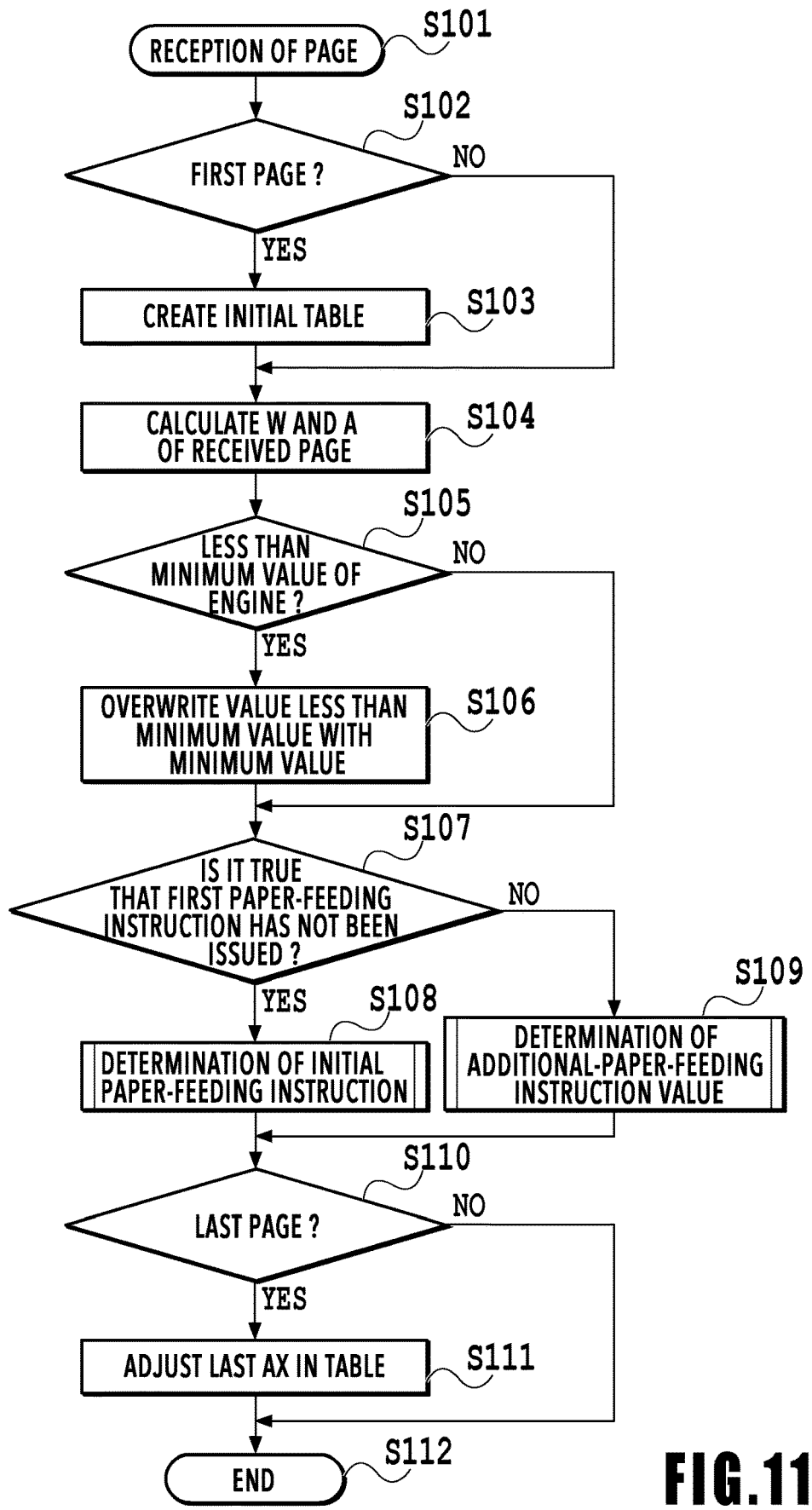
FIG. 11 is a flowchart illustrating a process of generating a table.

The flowchart in FIG. 11 illustrates an overall procedure for the creation process and updating process of a paper-feeding instruction table. The process illustrated in this flowchart is implemented by the processing unit 131 reading and executing a program stored in ROM or the like in the storing unit 132. The process illustrated in FIG. 11 is executed by the paper-feeding-instruction-table creation unit 305 every time the paper-feeding-instruction-table creation unit 305 receives a notification issued when the job reception unit 302 receives each page information in the page reception process illustrated in FIG. 15. Every time the flowchart of FIG. 11 is executed, the paper-feeding instruction table is updated. When the page information 1602 on page 9 is received, the paper-feeding instruction table illustrated in FIG. 16 is completed. Note that the process in this flowchart is executed for the printing based on a print job received by the job reception unit 302. Here, it is assumed that the print job received by the job reception unit 302 is a job for executing multi-copy printing. The multi-copy printing includes collated printing and uncollated printing (collective printing). Collated printing is a printing method in which images are printed page by page in the page number order. In contrast, collective printing is a printing method in which in printing for a certain number of copies, the same page is printed successively for the certain number of copies, and then, the next page is printed successively for the certain number of copies. For example, in collated printing for two copies of a three-page document, pages 1 to 3 are first printed in order, and thereafter pages 1 to 3 are printed again. In contrast, in collective printing for two copies of a three-page document, page 1 is first printed two times successively, thereafter page 2 is printed two times successively, and then, page 3 is printed two times successively. In the present embodiment, it is assumed that the print job that the job reception unit 302 has received is one for executing multi-copy printing in collective printing method.

Figure 12:
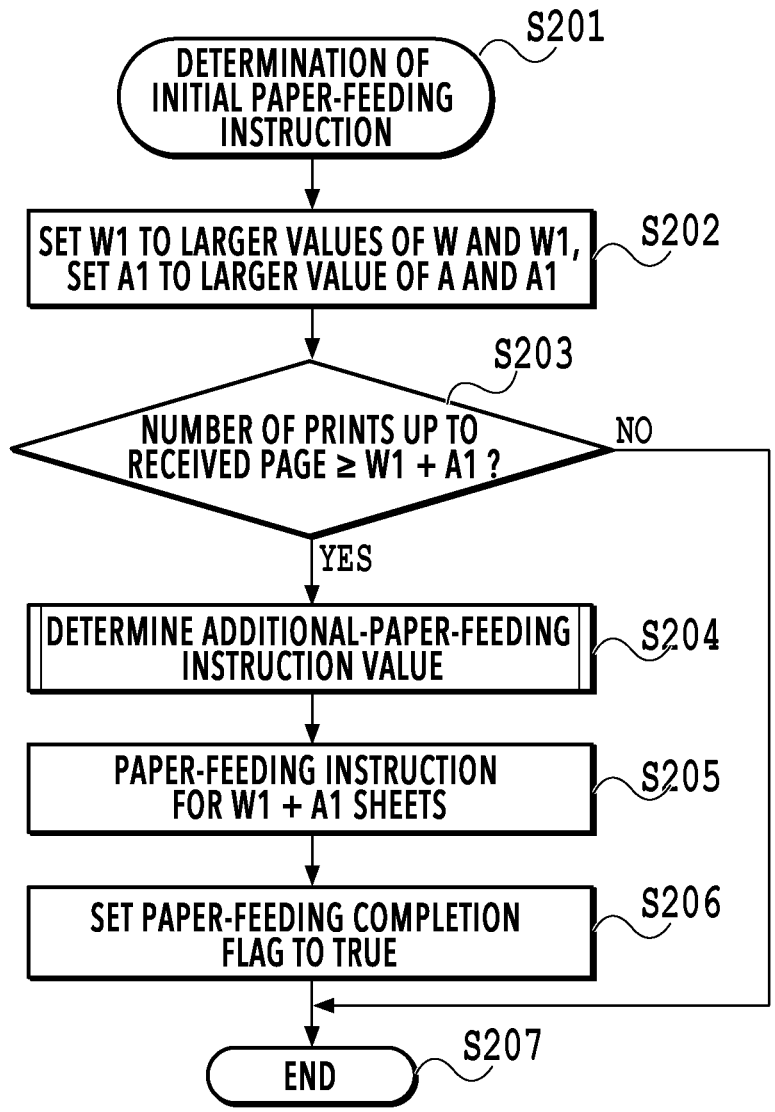
FIG. 12 is a flowchart illustrating a process for an initial paper-feeding instruction.
Figure 13B:
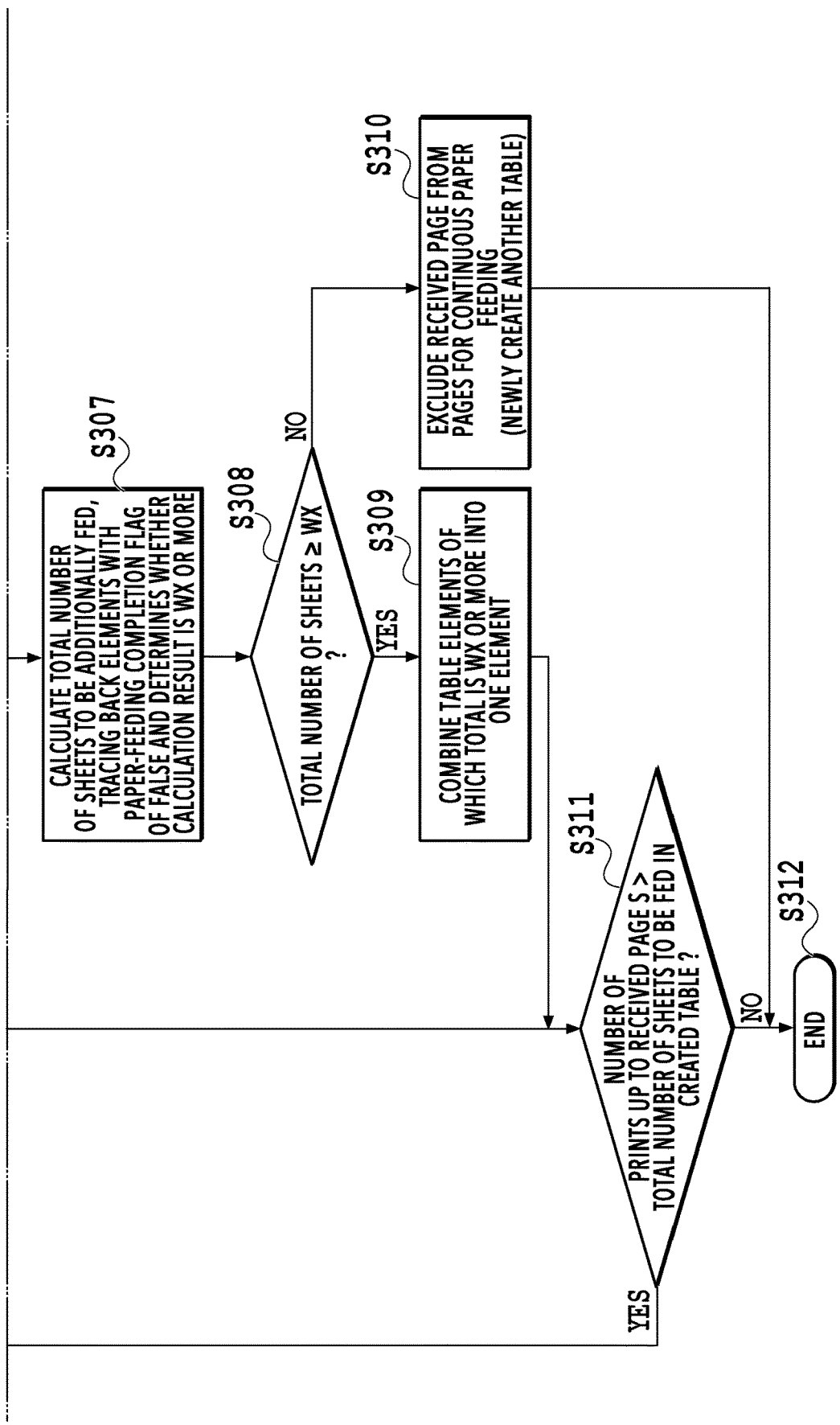

The flowchart of FIG. 12 illustrates a sub-procedure for performing a determination process of the first paper-feeding in the flowchart of FIG. 11. The flowcharts of FIGS. 13A and 13B is a sub-procedure illustrating a process for determining the additional-paper-feeding instruction value in FIGS. 11 and 12, and this process also updates the paper-feeding instruction table. The process illustrated in each flowchart is implemented by the processing unit 131 reading and executing a program stored in ROM or the like in the storing unit 132. In the following, the process executed in each flowchart will be described in detail.

First, a description will be provided for the procedure at the reception of the page information on page 1.

A series of processes illustrated in FIG. 11 starts when the job reception unit 302 notifies the paper-feeding-instruction-table creation unit 305 of the reception of page information in the control unit 301 (S101).

At S102, it is determined by referring to the page information on the received page whether the received page is the page information on the first page of the pages for printing and paper feeding. Since page 1 is the first page, the determination result at S102 is YES, and the process proceeds to S103.

At S103, an initial table is created as a paper-feeding instruction table. This initial table is a table including only one element of which the paper-feeding number 801 illustrated in FIG. 8 is [1]. In the initial table, the paper-feeding timing W802 and the number of sheets to be additionally fed A803 are set to minimum values predetermined by the engine controller 13B. The minimum value of the paper-feeding timing W802 is an indication for the engine controller 13B to receive additional paper feeding value indicating, and takes a value indicating how many preceding sheets should be present at a time when the engine controller 13B adds additional sheets before the sheets run out. The minimum value of the number of sheets to be additionally fed A803 is a value indicating the least number of sheets waiting to be fed that should remain at a timing when the paper-feeding instruction is issued to execute printing continuously. These minimum values are dependent on the performance of the engine included in the paper feeding mechanism (paper-feeding unit), and the higher performance the engine has, the smaller the values are.

The minimum values predetermined by the engine controller 13B are obtained in advance at the time of start-up operation or other occasions from the job management section 303 via the paper-feeding control section 306. In the example of FIG. 15, the minimum values of the paper-feeding timing W802 and the number of sheets to be additionally fed A803 both are 3s. Thus, in this case, the initial table illustrated in FIG. 17A is created. At this time, since paper feeding has not been performed yet, the paper-feeding completion flag is set to FALSE.

At S104, the paper-feeding timing W802 and the number of sheets to be additionally fed A803 are calculated using the received page information. This paper-feeding timing W802 is obtained by performing calculation shown in the following formula:

$$W=(TR+TI+TT)\div TF \qquad \text{(formula 1)}$$

(rounded up after the decimal point).

Here, TR is the time period taken for the paper-feeding instruction, TI is the time period taken for image processing on received page information, TT is the time period taken for transfer processing for print data obtained by the image processing, and TF is the time interval of paper feeding performed one sheet by one sheet. The value of this paper-feeding timing W802 corresponds to the number of sheets that can be fed from the time when one paper-feeding instruction is transmitted to the time when the transfer processing is completed for the page information on the images to be printed on the sheets to be fed based on the one paper-feeding instruction. The paper-feeding instruction time TR and the paper-feeding interval TF are values determined by the engine controller 13B. These values TR and TF are obtained at the time of start-up operation or other occasions by the paper-feeding control section 306 from the engine controller 13B according to the instruction of the job management section 303, and the obtained values TR and TF are recorded in the job management section 303 so that the paper-feeding-instruction-table creation unit 305 can refer to them. In the present embodiment, TR and TF both are set to one second.

The image processing time TI and the transfer processing time TT are calculated at the reception of page information by the paper-feeding-instruction-table creation unit 305 for every received page based on the maximum required time taken for processing performed in the image processing unit 134. Examples of calculation methods include a method in which a table including the sheet size, the resolution, and the like as parameters is held, and the maximum processing time is calculated for every page. In this example, the time periods taken for the image processing and the transfer processing both are two seconds for pages 1 to 3 and pages 7 to 9. The times period taken for the image processing and the transfer processing both are one second for pages 4 to 6.

From these values, the value of the paper-feeding timing W802 for page 1 is calculated according to the above formula 1 as follows:

$$W=(1+2+2)\div 1=5.$$

For the number of sheets to be additionally fed A803 in the initial table, 3 is used which is the minimum value determined by the engine controller 13B.

At S105, it is determined whether the W calculated at S104 is less than the minimum value predetermined by the engine controller 13B. For page 1, W is 5 which is more than 3, the minimum value of the engine, thus the determination result at S105 is NO, and the process proceeds to S107. In the example of FIG. 15, there is no case where the determination result at S105 is YES (W<3). However, for example, in the case where the W calculated at S104 is 2, the process proceeds to S106, the value of W is overwritten with 3 which is the minimum value of the engine, and then the process proceeds to S107.

At S107, it is determined whether the first paper-feeding has been instructed. For this determination, the paper-feeding completion flag F804 of the element of which the paper-feeding number 801 shown in FIG. 8 is [1] is checked. If the flag F804 is FALSE, it is determined that the first paper-feeding has not been instructed. At the time when only the page information on page 1 is received, paper feeding has not been instructed, and thus the paper-feeding completion flag F804 is FALSE. Thus, the determination result at S107 is YES, and then the process proceeds to a first paper-feeding determination step at S108, where it is determined whether to perform the first paper-feeding.

At S108, the sub-procedure of FIG. 12 is executed. Note that in the following description, in order to refer to each element of the paper-feeding instruction table, the paper-feeding timing W and the number of sheets to be additionally fed A in the case where the paper-feeding number is X are expressed as WX and AX, respectively.

The flowchart of FIG. 12 is for setting the values of W1 and A1 in the first element of the paper-feeding instruction table created at S103 in FIG. 11 (the element with a paper-feeding number of [1], hereinafter also referred to as the element [1]), and determining whether to issue the first paper-feeding instruction.

At S202, the paper-feeding timing W and the number of sheets to be additionally fed A calculated at S104 are compared to the paper-feeding timing W1 and the number of sheets to be additionally fed A1 in the first element [1] of the paper-feeding instruction table. Then, the larger values are respectively set as W1 and A1. This is because if a value smaller than the minimum value predetermined by the engine controller 13B is set, it is impossible to perform continuous paper feeding. At the reception of page 1, the values of the paper-feeding timing W and the number of sheets to be additionally fed A both are 3s as shown in the initial table FIG. 17A. The values of the paper-feeding timing W1 and the number of sheets to be additionally fed A1 calculated at S104 are 5 and 3, respectively. Thus, W is overwritten with W1 to be 5, and A1 remains at 3. As a result, the paper-feeding instruction table is as shown in FIG. 17B.

At S203, it is determined whether the number of prints that the page information up to the received page corresponds to (hereinafter, the number of prints explained now is denoted by S) is more than or equal to the sum value of the paper-feeding timing W1 and the number of sheets to be additionally fed A1. The sum value (W1+A1) is the number which is to be designated by the initial paper-feeding instruction, and thus in the case where S has not reached the number of the paper-feeding instruction, the paper-feeding instruction is not issued. The number of prints S is a value obtained by multiplying the number of received pages by the number of copies. Hence, in the example of FIG. 16, at the reception of page 1, S is 4. Here, the foregoing sum value (W1+A1) is 8, thus the determination result at S203 is NO, and then the process proceeds to S207, where the process ends without issuing the paper-feeding instruction. Then, the process proceeds to S110 in FIG. 11.

At S110, it is determined by referring to the page information on the received page whether the received page is the last page in the print job. Since page 1 is not the last page, the determination result at S110 is NO, the process proceeds to S112, and the process for the page 1 reception ends.

Next, a description will be provided for the process at the reception of the page information on page 2.

Since it is determined at S102 in FIG. 11 that page 2 is not the first page, the determination result is NO. Consequently, an initial table is not created, but the process proceeds to S104. At S104, the values of W and A are calculated as for the case of page 1. Also, for page 2, the time periods of TR, TI, TT, and TF are the same as for page 1 as illustrated in FIG. 15. Thus, for page 2, the values calculated at S104 are W=5 and A=3. After that, it is determined at S107 whether the first paper-feeding instruction has been issued. Since the paper-feeding instruction has not been issued yet at the reception of page 2, the determination result at S107 is YES, and the process proceeds to S108.

At S108, the process transfers to S202 in FIG. 12. At S202, since W1=W=5 and A1=A=3, the values of W1 and A1 are not changed, and the process proceeds to S203. When the page information for page 2 is received, the number of prints S is 2 pages×4 copies=8 sheets. Here, the sum value (W1+A1) is also 8 as described above. Thus, the determination result is YES, and the process proceeds to S204.

At S204, the sub-procedure starting from S301 in FIG. 13A is executed. At S302, every time page information on each page is received, it is determined by checking the last paper-feeding completion flag F804 whether paper feeding has been done for all the elements of the paper-feeding instruction table. The last paper-feeding completion flag F804 to be checked at the reception of the page information on page 2, is the paper-feeding completion flag F804 in the element of which the paper-feeding number 801 is [1] (element [1]). Since the paper-feeding instruction has not been issued at this time, the paper feeding flag in the element [1] is FALSE. Thus, the determination result at S302 is YES. In the case where the determination result at S302 is YES, there is a possibility that the paper feeding table already created includes paper feeding for the received page. For example, since W1+A1=8 in the first paper-feeding instruction 1606 (FIG. 15), it instructs paper feeding of 8 sheets. With this paper-feeding instruction 1606, the number of sheets to be printed is now 8, which is the sum of 4 sheets of page 1 and 4 sheets of page 2. In other words, the paper-feeding instruction for page 2 is included in the paper-feeding instruction in the element [1] in the table that was already created at the reception of the page information on page 1.

Thus, if the determination result at S302 is YES, the process proceeds to S303, where it is determined whether the paper feeding table already created includes paper feeding of the received page, in other words, it is determined whether the number of prints S up to the received page is less than or equal to the total number of sheets to be fed in the paper-feeding instruction table. As described above, at the reception of the page information on page 2, the number of prints S is 8, and the first paper-feeding according to the paper-feeding instruction table is W1+A1=8. This means that paper feeding for page 2 is all included in the table element with a paper-feeding number 801 of [1]. Thus, the determination at S303 is YES, and there is no need to add a table element. Note that in the processes after page 3 described later, there are cases where the number of prints up to the received page is less than or equal to the total number of sheets to be fed in the paper-feeding instruction table (where the determination result at S303 is NO). In this case, the process transfers to S305, where a process to add a new element to the paper-feeding instruction table is performed.

At S304, the paper-feeding timing WX and the number of sheets to be additionally fed AX at the paper-feeding number X are respectively compared to the paper-feeding timing W and the number of sheets to be additionally fed A obtained by the calculation. Then, the larger values are respectively set as WX and AX. As described with reference to FIG. 9 and FIGS. 10A to 10C, for pages the processing time for which is long, it is necessary to increase the paper-feeding timing W802 and the number of sheets to be additionally fed A803. Thus, larger values are set in the paper-feeding instruction table at S304. Since W1=W=5 and A1=W=3 for page 2, the values of W1 and A1 are not changed.

At S306, it is determined whether the value of the paper-feeding timing WX in the element with a paper-feeding number of X of the paper-feeding instruction table is less than or equal to the paper-feeding timing W(X−1) in the element with a paper-feeding number of (X−1) which is the preceding number. Since the paper-feeding instruction table has only one element at the time of page 2, the comparison is performed not with the paper-feeding timing W(X−1) in the preceding element but between the value of the paper-feeding timing W1 and the value of the paper-feeding timing W. Here, the determination result is YES, and the process proceeds to S311.

In the case where the number of copies in printing is large, there is a case where multiple elements of the paper-feeding instruction table are created for one page as described below. Thus, at S311, it is determined whether the total number of sheets to be fed in the table already created has reached the number of prints up to the received page. For page 2, the number of prints up to the received page is 8, and the total number of sheets to be fed in the created table is also 8. Consequently, the determination result of at S311 is NO, the process proceeds to S312, where the sub-procedure in FIGS. 13A and 13B ends, and the process proceeds to S205 in FIG. 12.

At S205, the paper-feeding-instruction-table creation unit 305 requests the job management section 303 to issue the first paper-feeding instruction. This paper-feeding instruction corresponds to 1606 in FIG. 15. Next, the process proceeds to S206, where the paper-feeding completion flag F of the table element with a paper-feeding number of 1 is set to TRUE. The paper-feeding instruction table at this time is illustrated in FIG. 17C. Here, the sub-procedure ends, and the process proceeds to S110 in FIG. 11. The process from S110 is the same as for page 1.

Next, a description will be provided for the process at the reception of the page information on page 3.

At S101 to S106 in FIG. 11, the same process is performed as for the reception of the page information on page 2. At S107, it is determined whether the first paper-feeding instruction has been issued, by checking the paper-feeding completion flag F804 in the element with a paper-feeding number 801 of [1]. At this time, the paper-feeding completion flag F804 in the element with a paper-feeding number 801 of [1] is TRUE. Thus, the determination result at S107 is NO, and the process proceeds to S109 where the additional-paper-feeding instruction value is determined.

At S109, the sub-procedure illustrated in FIGS. 13A and 13B is performed. At S302, the paper-feeding completion flag F804 in the element with a paper-feeding number 801 of [1] is referred to. Since this value is TRUE, the paper-feeding instruction for the number of sheets to be fed (the number of sheets for feeding) designated by the element with a paper-feeding number of [1] has been already issued. Hence, in order to perform paper feeding and printing for the newly received page (page 3), a new element needs to be added to the paper feeding table. The determination result at S302 is NO, and the process proceeds to S305.

At S305, a new element is added after the last element set in the paper-feeding instruction table. The paper-feeding number 801 of the newly added element is the value obtained by adding 1 to the paper-feeding number 801 of the last set element. The paper-feeding timing W802 and the number of sheets to be additionally fed A803 of the newly added element are set to the values calculated at S104 in FIG. 11 or the values written in at S106 by overwriting, and the paper-feeding completion flag F804 is set to FALSE. Consequently, in the element newly added at the reception of the page information on page 3, the paper-feeding number is [2]; the paper-feeding timing W2, 5; the number of sheets to be additionally fed A2, 3; and the paper-feeding completion flag F804, FALSE.

Next, at S306, it is determined whether the value of the paper-feeding timing WX (the number of sheets) in the newly added element is less than or equal to the paper-feeding timing W(X−1) in the element the paper-feeding number of which is one before the newly added element. At the reception of the page information on page 3, the newly added element is the element with a paper-feeding number of [2], and the paper-feeding timing W2 in this element is 3. The paper-feeding timing W1 in the element with a paper-feeding number of [1] which is the preceding element is 5. Thus, the determination result at S306 is YES, and the process proceeds to S311.

At S311, it is determined as described above whether the total number of sheets to be fed in the table already created is more than the number of prints up to the received page. In this case, since the page information for page 3 has been received, the number of sheets that can be printed S is 3 pages×4 copies=12 sheets. The total number of sheets to be fed in the elements created in the paper-feeding instruction table is the sum of 8 (W1+A1) designated by the first paper-feeding instruction 1606 and 3 (A2) designated by the second paper-feeding instruction 1609, and the result is (8+3)=11. Thus, only with the second paper-feeding instruction, the fourth copy of page 3 will not able to be printed. In order to check such a situation, it is determined at S311 whether the number of sheets that can be printed is more than the number of sheets to be actually fed. Here, the number of sheets that can be printed S is more than the number of sheets to be actually fed, and a situation where printing cannot be performed has occurred as described above, and thus the determination result at S311 is YES. In this case, to make it possible to print the fourth copy of page 3, a process of adding an element for an additional paper-feeding instruction is performed. In the example of FIG. 15, to make it possible to print the fourth copy of page 3, the paper-feeding instruction 1610, which is next to the paper-feeding instruction 1609, is issued. A process of adding an element to issue the paper-feeding instruction 1610 to the paper-feeding instruction table is performed from S302 which is the next step.

When the determination result at S311 turns out to be YES, the process returns to S302, and it is determined whether the paper-feeding completion flag in the last element of the paper-feeding instruction table is FALSE. Here, the paper-feeding completion flag F804 in the element with a paper-feeding number 801 of [2] is referred to. Since the flag is FALSE, the determination result at S302 is YES, and the process proceeds to S303.

At S303, the number of sheets that can be printed is compared with the total number of sheets designated by the paper-feeding instruction according to the paper-feeding instruction table. At this moment, since the page information up to page 3 has been received, the number of sheets that can be printed is 12, and the total number of sheets designated by the paper-feeding instruction according to the table is 11. Thus, the determination result at S303 is NO, and the process proceeds to S305 to add an element to the table. At S305, an element in which the paper-feeding number is [3], W3=5, A3=3, and F=FALSE is added as a new element (see FIG. 17D).

At S306, it is determined whether the value of the paper-feeding timing W3 in the newly added element is less than or equal to the paper-feeding timing W2 in the preceding element. In this case, since W2=5, and W3=5, the determination result is YES, and the process proceeds to S311.

At this stage, since the number of prints Sup to the received page is 12, and the total number of sheets designated by the paper-feeding instruction according to the paper-feeding instruction table is 14, the determination result at S311 is NO, and the process proceeds to S312, where the sub-procedure ends. Then, the process proceeds to S110 in FIG. 11, where it is determined whether the received page information is for the last page. Since page 3 is not the last page, the process proceeds to NO and ends at S112. After the process described above, the paper-feeding instruction table includes the elements with paper-feeding numbers of [1] to [3] as illustrated in FIG. 17D. This indicates that multiple elements of the paper-feeding instruction table can be created for one page.

When the page information for page 4 to page 6 are received, the same process as described above is performed, and the paper-feeding instruction table is further updated. When the process for page 6 is completed, the table at that moment is as illustrated in FIG. 17E.

Next, a description will be provided for the process at the reception of the page information on page 7.

When the page information on page 7 is received, the same process as described above is performed, and the process at S307 adds an element with a paper-feeding number 801 of [8]. With this, the paper-feeding instruction table is now in the state described in FIG. 17F. In this state, the process proceeds to S306 in FIGS. 13A and 13B.

At S306, since the paper-feeding timing W8, which is WX, =5, and the paper-feeding timing W7, which is the preceding timing W(X−1), =3, the determination result is NO. In the case where the value of the paper-feeding timing WX is more than the value of the preceding paper-feeding timing W(X−1) as described above, it means that the received page requires a long processing time and that the situation in FIG. 9 has occurred. To keep continuous paper feeding even in this situation, the process at S307 and after is executed.

At S307, the total number of sheets that have not been fed (the total number of sheets the paper-feeding completion flag for which is FALSE) is calculated, tracing back in the paper-feeding instruction table. When the paper-feeding instruction table becomes as illustrated in FIG. 17F at the reception of page 7, in other words, when the element with a paper-feeding number of [8] is added, the number of sheets to be additionally fed A7 in the preceding element (the element with a paper-feeding number of [7]) to the number of sheets to be additionally fed A2 are traced back, and the sum of these numbers is calculated. The total number of sheets is A7+A6+A5+A4+A3+A2=18. After calculating the total number of sheets, the process proceeds to S308.

At S308, it is determined whether the total number of sheets calculated at S307 is more than or equal to the paper-feeding timing WX (here, W8). In the state where the element with a paper-feeding number of [8] is added at the reception of the page information on page 7, the paper-feeding timing W8=5. The value the total number of sheets described above is 18. Thus, the total number of sheets (18)≥WX(5), and the determination result at 308 is YES.

In the case where the total number of sheets is more than or equal to WX (YES at S308) as above, the process proceeds to S309, where some of the elements of the paper-feeding instruction table are deleted, and a process to rewrite the paper-feeding instruction table is performed so as to be in time for paper feeding. Specifically, at S309, tracing back elements of the paper-feeding instruction table, the elements with sheets to be additionally fed, the total number of which sheets is more than or equal to the value of the paper-feeding timing WX, are combined into one element. In the case of FIG. 17F, the sum of the numbers of sheets to be additionally fed A in the elements with paper-feeding numbers of [6] and [7] is 6, which is more than or equal to the paper-feeding timing W8 (=5) in the element with a paper-feeding number of [8]. Thus, the elements with paper-feeding numbers [6] and [7] are combined into one element, and the paper-feeding number of this element is set to [6]. In the case where multiple elements of the paper feeding table are combined into one as described above, the paper-feeding timing in this element is set to the largest value of those in the elements before the combination. Here, since the paper-feeding timings W6 and W7 in the elements with paper-feeding numbers of [6] and [7] both are 3s, the paper-feeding timing W6 in the element [6] into which the two elements were combined is set to 3. The number of sheets to be additionally fed A803 is set to the sum value of the elements [6] and [7] which were combined, and thus the number of sheets to be additionally fed A6 is 6. Since as a result of combining the elements of the table into one, the paper-feeding numbers are not consecutive, the last paper-feeding number is changed from [8] to [7]. Now, the paper-feeding instruction table is as illustrated in FIG. 17G. Then, the process proceeds to S311, where the same process as described earlier is performed.

Note that in the example of FIG. 16, there is no case where it is determined that the sum of the numbers of sheets to be additionally fed A, the paper feeding for which has not been performed, is less than the paper-feeding timing W8, and thus there is no case where the determination result at S308 is NO. However, in the case where the paper-feeding instruction has been issued, and paper feeding is in progress, there is a possibility that the sum of the numbers is less than WX. In that case, since the element the paper-feeding instruction for which has been already issued cannot be changed, it is impossible to combine elements of the paper-feeding instruction table. Thus, in the case where the determination result at S308 is NO, inclusion of the received page in the pages for continuous paper feeding is given up, and the process proceeds to S310, where another table is newly created, and the sub-procedure ends (S312).

When the page information on page 8 is received, the same process as described earlier is performed. When the page information on page 9 is received, the process from S101 to S109 is performed in the same manner. Here, since page 9 is the last page, the determination result at S110 is YES, and the process proceeds to S111.

At S111, the number of sheets to be additionally fed A803 in the last element of the paper-feeding instruction table is adjusted such that the total number agrees with the number of prints predetermined in the print job, the paper-feeding instruction table is updated, and the process ends (S112). For page 9, the number of sheets to be additionally fed A10 is changed from 3 to 1. With the operation above, the paper-feeding instruction table in FIG. 16 is completed.

As has been described above, in the present embodiment, at every reception of page information on each page, an element of the paper-feeding instruction table is created. Each element is created dynamically with the processing time for the image of each page and the current state of paper feeding taken into account. Then, paper-feeding operation is executed based on the created paper-feeding instruction table.

Figure 14:
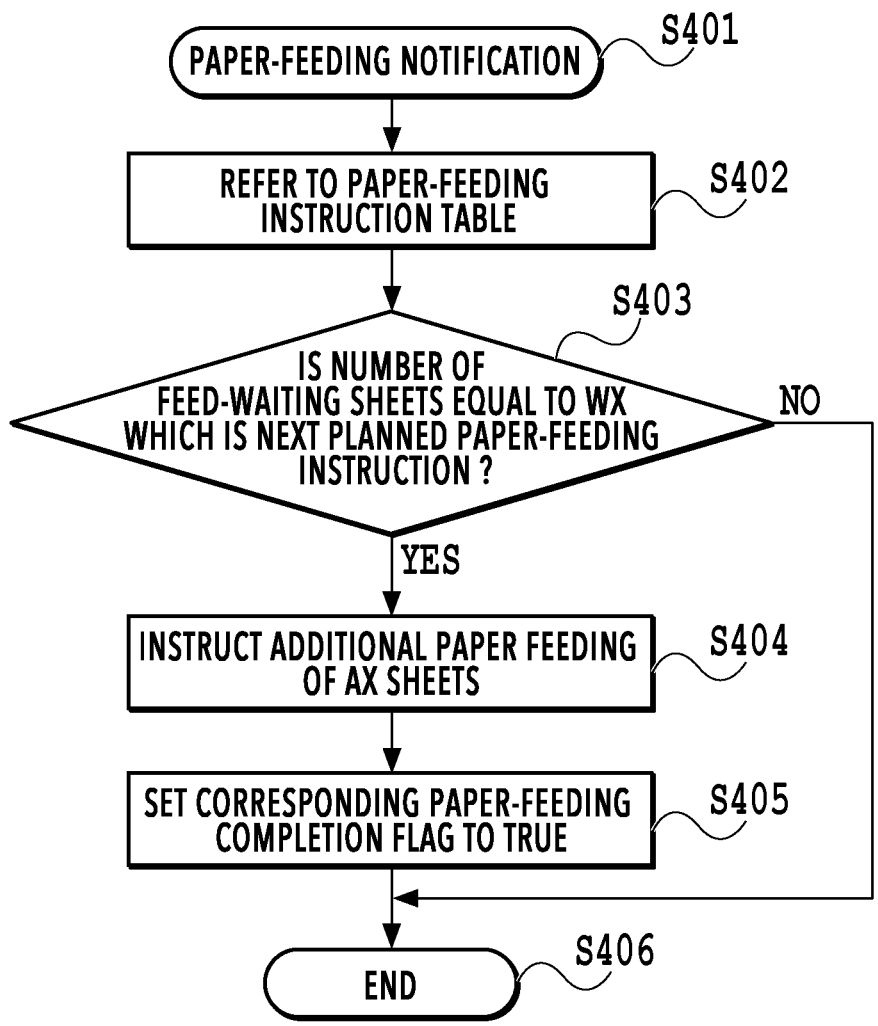
FIG. 14 is a flowchart illustrating a process of performing additional paper-feeding in response to a paper-feeding notification.

Next, paper-feeding operation performed based on FIG. 14 will be described based on an example where the operation illustrated in FIG. 15 is performed. The process illustrated in FIG. 14 is executed in response to every paper-feeding instruction issued from the engine controller 13B every time paper feeding of one sheet is performed (S401). Specifically, paper feeding starts in response to the paper-feeding instruction 1606 illustrated in FIG. 15, and the first process based on FIG. 14 starts in response to the paper-feeding notification 1607.

In the flowchart of FIG. 14, when the paper-feeding notification 1607 is issued from the engine controller 13B (S401), the job management section 303 refers to the paper-feeding instruction table created by the paper-feeding-instruction-table creation unit 305 (S402). At S403, the number of feed-waiting sheets that have not been fed is calculated, and it is determined whether the number of feed-waiting sheets calculated is equal to the paper-feeding timing WX, at which the next paper-feeding instruction is issued, in the paper-feeding instruction table. In the example illustrated in FIG. 15, when the paper-feeding notification 1607 is issued, the number of feed-waiting sheets is 7, and the paper-feeding timing W2 indicating the next planned paper feeding is 5. Consequently, the determination result at S403 is NO, and the process proceeds to S406 and ends.

After that, the process in response to the paper-feeding notification is executed in the same manner. When the paper-feeding notification 1608 is issued, the number of feed-waiting sheets is 5 at the moment, and the paper-feeding timing W2 indicating the next planned paper feeding is 5. Consequently, the determination result at S403 is YES, and the process proceeds to S404.

At S404, the job management section 303 instructs the engine controller 13B via the paper-feeding control section 306 to perform additional paper feeding in the number (3) predetermined in the number of sheets to be additionally fed A2 in the paper-feeding instruction table. This instruction corresponds to the additional paper-feeding instruction 1609 in FIG. 15.

At S405, the paper-feeding completion flag F804 corresponding to the paper-feeding instruction is set to TRUE, and the process proceeds to S406 and ends. Since the paper-feeding instruction 1609 is the second paper-feeding instruction, the paper-feeding completion flag F804 of the element with a paper-feeding number 801 of [2] is set to TRUE. The process described above is repeated for every paper-feeding notification, and when the paper-feeding completion flag F804 of the element with a paper-feeding number 801 of [10] is set to TRUE, the process is completed.

As has been described above, in the present embodiment, when continuous printing for a predetermined number of sheets is performed, paper feeding in the number of sheets to be fed is divided. When doing this, the instruction for a next paper feeding is issued earlier than the timing when the paper-feeding operation based on the preceding paper-feeding instruction finishes, by at least the time period longer than or equal to the minimum time determined by the engine. This enables continuous paper-feeding operation.

Also, in the present embodiment, since the paper-feeding instruction is divided, in the case when a paper feeding stop command (feeding stop command) is issued to stop paper feeding in the middle of paper-feeding operation, the paper-feeding instruction to be issued after that can be cancelled. Consequently, in the case where a paper feeding stop command is issued, it is possible to stop paper feeding and printing with only a small number of sheets consumed and thus possible to reduce wasteful not-intended printing. In contrast, in the case where printing is started with an instruction issued in advance for paper feeding corresponding all the sheets for all the continuous printing, even if a paper-feeding stop instruction is issued in the middle of the operation, paper-feeding operation and print operation will not stop until a series of continuous paper-feeding operations finishes. Thus, the number of print sheets that will be printed after the issuance of the paper-feeding stop instruction is large compared to that in the present embodiment.

Further in the present embodiment, the time period taken for the processes concerning the image data (the image processing and the transfer processing) is taken into account to set the paper-feeding timing W and the number of sheets to be additionally fed A for each paper-feeding operation. Specifically, a next paper-feeding instruction is transmitted earlier than the timing when the paper-feeding operation based on the preceding paper-feeding instruction finishes, at least by the time period required for the process concerning the image data corresponding to the images to be printed on the sheets to be fed by the paper-feeding operation based on the next paper-feeding instruction. In other words, for a page that necessitates longer time for the image data processing, the paper feeding instruction for it is issued at an earlier timing. Consequently, it possible to avoid the situation where the process concerning the image data is later than continuously-fed print media, and a not-printed sheet (blank sheet) is discharged. This operation makes it possible to reduce the number of wasteful discharged sheets (discharged blank sheet). In addition, since the paper-feeding timing and the number of sheets to be additionally fed are set according to the time period taken for image data processing, it is possible to further reduce the number of sheets fed after a paper-feeding stop instruction is issued and until the paper feeding stops. This point will be described below with reference to FIGS. 18A and 18B.

FIGS. 18A and 18B are diagrams indicating that the above process in the present embodiment makes it possible to complete printing earlier in the case where a paper-feeding stop instruction is issued. FIG. 18A illustrates an example where even in the case where the processing time concerning the image of a received page becomes shorter in the middle of the process, the timing to issue the paper-feeding instruction (paper-feeding timing W) and the number of sheets to be additionally fed A are not changed. In contrast, FIG. 18B illustrates an example where in the case where the processing time concerning the image of a received page becomes shorter in the middle of the process, the timing to issue the paper-feeding instruction and the number of additional sheets are changed according to the processing time.

In the example illustrated in FIG. 18A and in the example illustrated in FIG. 18B, a paper feeding stop command 1501 is issued at the same timing. In the example illustrated in FIG. 18B, according to the processing time concerning images, the paper-feeding timing is made delayed (the number of feed-waiting sheets is reduced), and the number of sheets to be additionally fed is reduced. Consequently, the number of sheets discharged after the issuance of the paper-feeding stop instruction is smaller than in the example illustrated in FIG. 18A. Specifically, while 20 sheets are discharged in the example illustrated in FIG. 18A, 16 sheets are discharged in the example illustrated in FIG. 18B. In summary, in the example illustrated in FIG. 18B, the time period until printing completion and the number of prints can be reduced by the time period and the number corresponding to 4 sheets, compared to the example illustrated in FIG. 18A.

In the present embodiment illustrated with reference to FIGS. 11 to 17G, the paper-feeding timing and the number of sheets to be fed are set according to the processing time concerning images in the same manner as in the example of FIG. 18B, it is possible to reduce the number of sheets discharged after the issuance of the paper-feeding stop instruction. However, also the case of FIG. 18A is still effective because it is possible to reduce the number of sheets discharged after the issuance of the paper-feeding stop instruction, compared to the case of a conventional technique in which printing is started with an instruction issued in advance for paper feeding corresponding to all the sheets for all the continuous printing. The present invention also includes the example illustrated in FIG. 18A.

As has been described above, according to the present embodiment, since the paper-feeding instruction is controlled with the processing time for received pages taken into account, it is possible to perform continuous printing properly and also possible to stop paper feeding and printing in a rapid manner once a paper-feeding stop instruction is issued. This makes it possible to reduce waste related to sheets, printing, and time and save the running cost.

(Other Embodiments)

The above embodiment has been described based on an example of an image forming apparatus that transfers images formed on the transfer body 2 by means of the full-line print heads configured to eject ink, onto print media fed from the feeding unit 7. However, the present invention is not limited to image forming apparatuses using such an image forming method. For example, the present invention is applicable to image forming apparatuses that eject ink directly to print media to form images and also image forming apparatuses using an electrophotographic method. The present invention is applicable to any image forming apparatus equipped with a feeding unit capable of continuously feeding print media.

Also, the present invention is applicable to feeding apparatuses that continuously feed a predetermined number of print media. To be more specific, the feeding apparatus includes a creation unit that creates multiple paper-feeding instructions corresponding to the predetermined number, a feeding unit that continuously feeds print media in the number of sheets to be fed designated by the feeding instruction, and a control unit that controls the feeding unit. The control unit sends out the multiple feeding instructions sequentially to the feeding unit to make the feeding unit feed a predetermined number of print media and also performs control to cancel the feeding instruction to be sent out after this feeding instruction in response to a feeding stop command.

This operation makes it possible to stop feeding print media in a rapid manner in response to a feeding stop command and thus reduce wasteful feeding operation. Hence, in the case where a paper-feeding apparatus according to the present invention is applied to a system that performs various kinds of processing continuously on print media, and the system sends a feeding stop command to the feeding apparatus in synchronization with stopping of the processing, it is possible to reduce wasteful paper feeding to the processing process. Thus, the use of the feeding apparatus according to the present invention make the system efficient.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-148878, filed Aug. 7, 2018, which is hereby incorporated by reference herein in its entirety.

What is claimed is:

1. A feeding instruction apparatus comprising:
a job reception unit configured to receive a print job for printing images on multiple print media;
a data reception unit configured to receive image data corresponding to the received print job;
an image processing unit configured to perform predetermined image processing on the received image data; and
a transmission unit configured to transmit multiple feeding instructions in a case where the print job is received, the feeding instructions each being an instruction to feed a certain number of print media, the certain number being two or more but less than the total number of print media to be used for printing based on the one received print job, wherein
a timing when a predetermined feeding instruction included in the multiple feeding instructions is transmitted is controlled based on a time period required for the predetermined image processing to be performed on the image data corresponding to images to be printed on print media to be fed based on the predetermined feeding instruction,
every time a feeding unit receives the feeding instruction, the feeding unit feeds print media, the number of which is based on the received feeding instruction, one by one to a conveyance section, and
a printing section prints images based on the one print job onto multiple print media conveyed via the conveyance section based on the multiple feeding instructions.

2. The feeding instruction apparatus according to claim 1, wherein
a first feeding instruction in the multiple feeding instructions is transmitted next to a second feeding instruction in the multiple feeding instructions, and
a timing when the first feeding instruction is to be transmitted is controlled based on a timing when feeding of a certain number of print media based on the second feeding instruction is to finish.

3. The feeding instruction apparatus according to claim 2, wherein
the timing when the first feeding instruction is to be transmitted is earlier than the timing when the feeding of the certain number of print media based on the second feeding instruction is to finish by at least the time period required for the predetermined image processing to be performed on the image data corresponding to images to be printed on print media to be fed based on the first feeding instruction.

4. The feeding instruction apparatus according to claim 2, wherein
the timing when the first feeding instruction is to be transmitted is earlier than the timing when the feeding of the print media in the number based on the second feeding instruction is to finish by at least a total time period of a predetermined time period plus the time period required for the predetermined image processing to be performed on the image data corresponding to images to be printed on print media to be fed based on the first feeding instruction.

5. The feeding instruction apparatus according to claim 1, wherein
the number of print media to be fed based on the predetermined feeding instruction is controlled based on the time period required for the predetermined image processing to be performed on the image data corresponding to images to be printed on the print media to be fed based on the predetermined feeding instruction.

6. The feeding instruction apparatus according to claim 1, wherein
a first feeding instruction in the multiple feeding instructions is transmitted next to a second feeding instruction in the multiple feeding instructions, and
the number of print media to be fed based on the second feeding instruction is controlled based on the time period required for the predetermined image processing to be performed on the image data corresponding to images to be printed on print media to be fed based on the first feeding instruction.

7. The feeding instruction apparatus according to claim 1, wherein
the number of print media to be fed based on a feeding instruction second or subsequently transmitted out of the multiple feeding instructions is smaller than the number of print media to be fed based on a feeding instruction first transmitted out of the multiple feeding instructions.

8. The feeding instruction apparatus according to claim 1, wherein
the print job is a print job, based on which multiple images are printed such that a first image in the multiple images is printed successively for a certain number of copies, and then, a second image in the multiple images is printed successively for the certain number of copies.

9. The feeding instruction apparatus according to claim 1, wherein
a first feeding instruction in the multiple feeding instructions is transmitted next to a second feeding instruction in the multiple feeding instructions, and
even though the first feeding instruction and the second feeding instruction are transmitted sequentially, if the second feeding instruction does not arrive at the feeding unit by a timing when paper feeding based on the first feeding instruction is completed, printing based on the second feeding instruction is not performed, but a maintenance process is executed for the printing section.

10. The feeding instruction apparatus according to claim 1, further comprising
a feeding unit configured to cause the feeding unit to feed print media to the conveyance section.

11. The feeding instruction apparatus according to claim 1, further comprising
a printing unit configured to cause the printing section to print images based on the print job onto print media conveyed via the conveyance section.

12. The feeding instruction apparatus according to claim 1, wherein
the printing section forms images on print media using ink.

13. The feeding instruction apparatus according to claim 1, wherein
the printing section forms images by transferring ink images formed on a transfer body to print media.

14. A method of controlling a feeding instruction apparatus, the method comprising the steps of:
receiving a print job for printing images on multiple print media;
receiving image data corresponding to the received print job;
performing predetermined image processing on the received image data; and
transmitting multiple feeding instructions in a case where the print job is received, the feeding instructions each being an instruction to feed a certain number of print media, the certain number being two or more but less than the total number of print media to be used for printing based on the one received print job, wherein
a timing when a predetermined feeding instruction included in the multiple feeding instructions is transmitted is controlled based on a time period required for the predetermined image processing to be performed on the image data corresponding to images to be printed on print media to be fed based on the predetermined feeding instruction,
every time a feeding unit receives the feeding instruction, the feeding unit feeds print media, the number of which is based on the received feeding instruction, one by one to a conveyance section, and
a printing section prints images based on the one print job onto multiple print media conveyed via the conveyance section based on the multiple feeding instructions.

15. A non-transitory computer readable storage medium storing a program for causing a computer of a feeding instruction apparatus to perform a method of controlling the feeding instruction apparatus, the method comprising the steps of:
receiving a print job for printing images on multiple print media;
receiving image data corresponding to the received print job;
performing predetermined image processing on the received image data; and
transmitting multiple feeding instructions in a case where the print job is received, the feeding instructions each being an instruction to feed a certain number of print media, the certain number being two or more but less than the total number of print media to be used for printing based on the one received print job, wherein
a timing when a predetermined feeding instruction included in the multiple feeding instructions is transmitted is controlled based on a time period required for the predetermined image processing to be performed on the image data corresponding to images to be printed on print media to be fed based on the predetermined feeding instruction,
every time a feeding unit receives the feeding instruction, the feeding unit feeds print media, the number of which is based on the received feeding instruction, one by one to a conveyance section, and
a printing section prints images based on the one print job onto multiple print media conveyed via the conveyance section based on the multiple feeding instructions.

* * * * *